(12) United States Patent
Chakraborty et al.

(10) Patent No.: US 11,555,734 B1
(45) Date of Patent: Jan. 17, 2023

(54) SMART AND CLOUD CONNECTED DETECTION MECHANISM AND REAL-TIME INTERNET OF THINGS (IOT) SYSTEM MANAGEMENT

(71) Applicant: Zurn Industries, LLC, Milwaukee, WI (US)

(72) Inventors: Arindam Chakraborty, Milwaukee, WI (US); Glen Trickle, Milwaukee, WI (US)

(73) Assignee: Zurn Industries, LLC, Milwaukee, WI (US)

( * ) Notice: Subject to any disclaimer, the term of this patent is extended or adjusted under 35 U.S.C. 154(b) by 0 days.

(21) Appl. No.: 17/651,724

(22) Filed: Feb. 18, 2022

(51) Int. Cl.
G01F 23/80 (2022.01)
G01F 23/18 (2006.01)
G01F 23/20 (2006.01)
G01F 23/296 (2022.01)

(52) U.S. Cl.
CPC ........... *G01F 23/802* (2022.01); *G01F 23/18* (2013.01); *G01F 23/20* (2013.01); *G01F 23/296* (2013.01)

(58) Field of Classification Search
CPC ........ G01F 23/18; G01F 23/802; G01F 23/20; G01F 23/296
USPC .................................................. 340/618–624
See application file for complete search history.

(56) References Cited

U.S. PATENT DOCUMENTS

| | | |
|---|---|---|
| 4,563,780 A | 1/1986 | Pollack |
| 4,805,247 A | 2/1989 | Laverty, Jr. |
| 5,217,035 A | 6/1993 | Van Marcke |
| 5,438,714 A | 8/1995 | Shaw |
| 5,612,890 A | 3/1997 | Strasser et al. |
| 5,655,961 A | 8/1997 | Acres et al. |
| 5,838,258 A | 11/1998 | Saar |
| 5,844,808 A | 12/1998 | Konsmo et al. |
| 6,018,827 A | 2/2000 | Shaw et al. |
| 6,038,519 A | 3/2000 | Gauthier et al. |

(Continued)

FOREIGN PATENT DOCUMENTS

| | | |
|---|---|---|
| CN | 101702035 A | 5/2010 |
| CN | 112258542 A | 1/2021 |

(Continued)

OTHER PUBLICATIONS

AcuityControls, "nLIGHT Network Lighting Control," Copyright 2014, (78 Pages).

(Continued)

*Primary Examiner* — Nathaniel J Kolb
(74) *Attorney, Agent, or Firm* — Michael Best & Friedrich LLP

(57) ABSTRACT

A fixture for flooding detection that includes a communication interface; a processor; and a computer-readable storage media coupled to the processor and having instructions stored thereon which, when executed by the processor, cause the processor to perform operations comprising: receiving, from a first sensor, a first signal indicative of a water level at a location within a facility, determining, based on the first signal, the water level at the location within the facility, determining a shut-off condition based on the water level at the location within the facility reaching a first predetermined height, and transmitting, via the communication interface, a shut-off signal to at least one water inlet at the location within the facility.

17 Claims, 17 Drawing Sheets

(56) References Cited

U.S. PATENT DOCUMENTS

| | | |
|---|---|---|
| 6,189,163 B1 | 2/2001 | Van Marcke |
| 6,236,953 B1 | 5/2001 | Segal |
| 6,337,635 B1 | 1/2002 | Ericksen et al. |
| 6,347,414 B2 | 2/2002 | Contadini et al. |
| 6,411,920 B1 | 6/2002 | McConnell et al. |
| 6,583,720 B1 | 6/2003 | Quigley |
| 6,642,843 B2 | 11/2003 | Satoh |
| 6,694,177 B2 | 2/2004 | Eggers et al. |
| 6,701,194 B2 | 3/2004 | Gauthier et al. |
| 6,749,122 B1 | 6/2004 | Koenck et al. |
| 6,766,221 B1 | 7/2004 | Christiansen |
| 6,769,443 B2 | 8/2004 | Bush |
| 6,956,498 B1 | 10/2005 | Gauthier et al. |
| 6,967,565 B2 | 11/2005 | Lingemann |
| 7,023,341 B2 | 4/2006 | Stilp |
| 7,053,767 B2 | 5/2006 | Petite et al. |
| 7,058,457 B2 | 6/2006 | Kuwahara et al. |
| 7,119,658 B2 | 10/2006 | Stilp |
| 7,143,007 B2 | 11/2006 | Long et al. |
| 7,177,725 B2 | 2/2007 | Nortier et al. |
| 7,222,111 B1 | 5/2007 | Budike, Jr. |
| 7,226,496 B2 | 6/2007 | Ehlers |
| 7,302,313 B2 | 11/2007 | Sharp et al. |
| 7,304,569 B2 | 12/2007 | Marcichow |
| 7,360,413 B2 | 4/2008 | Jeffries et al. |
| 7,755,493 B2 | 7/2010 | Berenguer et al. |
| 7,814,582 B2 | 10/2010 | Reddy et al. |
| 8,028,355 B2 | 10/2011 | Reeder et al. |
| 8,141,296 B2 | 3/2012 | Bem |
| 8,284,018 B2 | 10/2012 | Ibsies |
| 8,364,546 B2 | 1/2013 | Yenni et al. |
| 8,407,821 B2 | 4/2013 | Chan |
| 8,970,391 B2 | 3/2015 | Hoekstra |
| 9,169,625 B2 | 10/2015 | Chiu et al. |
| 9,240,111 B2 | 1/2016 | Scott et al. |
| 9,266,136 B2 | 2/2016 | Klicpera |
| 9,429,453 B1 | 8/2016 | O'Keeffe et al. |
| 9,574,374 B2 | 2/2017 | Klevens et al. |
| 9,582,581 B2 | 2/2017 | Ferrara et al. |
| 9,659,481 B2 | 5/2017 | Himmelmann et al. |
| 9,830,565 B2 | 11/2017 | O'Toole |
| 9,939,299 B2 | 4/2018 | Patel et al. |
| 9,956,306 B2 | 5/2018 | Brais et al. |
| 9,959,781 B2 | 5/2018 | Roark |
| 9,963,863 B2 | 5/2018 | Allard, III |
| 9,965,938 B1 | 5/2018 | Cronin et al. |
| 10,066,379 B2 | 9/2018 | Schomburg |
| 10,081,968 B2 | 9/2018 | Klevens et al. |
| 10,264,588 B2 | 4/2019 | Wegelin et al. |
| 10,276,018 B2 | 4/2019 | Brillaud |
| 10,329,744 B2 | 6/2019 | Abdel-Fattah et al. |
| 10,361,802 B1 | 7/2019 | Hoffberg-Borghesani et al. |
| 10,430,737 B2 | 10/2019 | Yenni et al. |
| 10,460,582 B2 | 10/2019 | Anderholm et al. |
| 10,485,388 B1 | 11/2019 | McIntosh |
| 10,504,070 B2 | 12/2019 | Jacobson |
| 10,504,355 B2 | 12/2019 | Wegelin et al. |
| 10,514,110 B2 | 12/2019 | Allard, III |
| 10,527,191 B2 | 1/2020 | Bush et al. |
| 10,529,167 B2 | 1/2020 | Khamphilapanyo et al. |
| 10,529,219 B2 | 1/2020 | Herdt et al. |
| 11,105,705 B1* | 8/2021 | Lowitz ............... G05D 7/0641 |
| 11,108,865 B1 | 8/2021 | Chakraborty et al. |
| 11,153,945 B1 | 10/2021 | Feil et al. |
| 11,307,570 B2 | 4/2022 | Trinh et al. |
| 2002/0007510 A1 | 1/2002 | Mann |
| 2002/0053969 A1 | 5/2002 | Wagner et al. |
| 2002/0099454 A1 | 7/2002 | Gerrity |
| 2006/0007008 A1* | 1/2006 | Kates ................ G01M 3/3245 |
| | | 340/618 |
| 2006/0208862 A1 | 9/2006 | Lahr et al. |
| 2008/0177411 A1 | 7/2008 | Marsh et al. |
| 2008/0228904 A1 | 9/2008 | Crespo-dubie et al. |
| 2008/0245738 A1 | 10/2008 | Coulter |
| 2009/0300988 A1 | 12/2009 | Bem |
| 2010/0114383 A1 | 5/2010 | Rosea et al. |
| 2010/0121613 A1 | 5/2010 | Rosea et al. |
| 2011/0113360 A1 | 5/2011 | Johnson et al. |
| 2011/0210077 A1 | 9/2011 | Coulter |
| 2012/0044350 A1 | 2/2012 | Verfuerth |
| 2013/0214166 A1 | 8/2013 | Barlow et al. |
| 2014/0236358 A1 | 8/2014 | Sasaki et al. |
| 2014/0249854 A1 | 9/2014 | Moore et al. |
| 2014/0379305 A1 | 12/2014 | Kumar |
| 2015/0229488 A1 | 8/2015 | Averitt |
| 2015/0233146 A1 | 8/2015 | Klevens et al. |
| 2015/0308856 A1 | 10/2015 | Srinivasan et al. |
| 2015/0373482 A1 | 12/2015 | Barnard et al. |
| 2016/0216706 A1 | 7/2016 | Christensen et al. |
| 2016/0258144 A1 | 9/2016 | Tayenaka et al. |
| 2016/0261425 A1 | 9/2016 | Horton et al. |
| 2016/0291841 A1 | 10/2016 | Mudireddy et al. |
| 2016/0345406 A1 | 11/2016 | Donhowe et al. |
| 2017/0005982 A1 | 1/2017 | Gould et al. |
| 2017/0006051 A1 | 1/2017 | Gould et al. |
| 2017/0019970 A1 | 1/2017 | Chemel et al. |
| 2017/0038224 A1 | 2/2017 | O'Keeffe et al. |
| 2017/0122005 A1 | 5/2017 | Klevens et al. |
| 2017/0126489 A1 | 5/2017 | Schiff et al. |
| 2017/0129383 A1 | 5/2017 | Buka et al. |
| 2017/0223807 A1 | 8/2017 | Recker et al. |
| 2017/0264731 A1 | 9/2017 | Breton et al. |
| 2017/0346651 A1* | 11/2017 | Somajini ............... G05B 15/02 |
| 2017/0358186 A1 | 12/2017 | Harpole |
| 2018/0052055 A1 | 2/2018 | Ikeda et al. |
| 2018/0198639 A1 | 7/2018 | Ishizaka |
| 2018/0217292 A1 | 8/2018 | Grosse-Puppendahl |
| 2018/0262573 A1 | 9/2018 | Przybylski et al. |
| 2018/0293877 A1 | 10/2018 | Barth |
| 2018/0354777 A1 | 12/2018 | Slater et al. |
| 2019/0001863 A1 | 1/2019 | Taylor |
| 2019/0051214 A1 | 2/2019 | Roark |
| 2019/0351442 A1 | 11/2019 | McNulty et al. |
| 2019/0353278 A1 | 11/2019 | Bush et al. |
| 2019/0354535 A1 | 11/2019 | Amin et al. |
| 2019/0359477 A1 | 11/2019 | Wegelin et al. |
| 2019/0360184 A1 | 11/2019 | Lawinger |
| 2019/0362617 A1 | 11/2019 | Bonner et al. |
| 2019/0387058 A1 | 12/2019 | Heller |
| 2019/0392377 A1 | 12/2019 | Munir et al. |
| 2020/0011005 A1 | 1/2020 | Okumura et al. |
| 2020/0032497 A1 | 1/2020 | Wu |
| 2020/0097030 A1 | 3/2020 | Carlson |
| 2020/0098199 A1 | 3/2020 | Bullock |
| 2020/0099679 A1 | 3/2020 | Carlson |
| 2020/0140254 A1 | 5/2020 | Slater et al. |
| 2020/0141773 A1 | 5/2020 | Burke et al. |
| 2020/0145257 A1 | 5/2020 | Samudrala |
| 2020/0217057 A1 | 7/2020 | Spiro et al. |
| 2020/0232832 A1 | 7/2020 | Burke et al. |
| 2020/0253187 A1 | 8/2020 | Flies et al. |
| 2020/0314866 A1 | 10/2020 | Wegelin et al. |
| 2020/0358852 A1 | 11/2020 | Burke et al. |
| 2020/0404357 A1 | 12/2020 | Kulkarni et al. |
| 2021/0027402 A1 | 1/2021 | Davis et al. |
| 2021/0144210 A1 | 5/2021 | Kohapure et al. |
| 2021/0358293 A1 | 11/2021 | Tournier et al. |
| 2022/0020249 A1 | 1/2022 | Castellano |
| 2022/0107632 A1 | 4/2022 | Sinha et al. |

FOREIGN PATENT DOCUMENTS

| | | | |
|---|---|---|---|
| JP | H07311280 A | 11/1995 | |
| JP | 2002021149 A | 1/2002 | |
| JP | 2002148354 A | 5/2002 | |
| JP | 2004117250 A | 4/2004 | |
| JP | 2004258927 A | 9/2004 | |
| JP | 2010216821 A | 9/2010 | |
| JP | 2019083360 A | 5/2019 | |
| JP | 2020051757 A | 4/2020 | |
| JP | 2021092094 A * | 6/2021 | |
| KR | 20060087797 A * | 8/2006 | ......... G06Q 10/0010 |
| KR | 101137918 B1 | 4/2012 | |
| KR | 102079443 B1 * | 2/2020 | ............ A10G 27/06 |

(56) References Cited

FOREIGN PATENT DOCUMENTS

| TW | I727415 B | 5/2021 | | |
|---|---|---|---|---|
| WO | WO1996041058 A1 | 12/1996 | | |
| WO | WO2002056540 A2 | 7/2002 | | |
| WO | WO-2020120975 A2 | * | 6/2020 | ............ B01D 29/60 |
| WO | WO-2022036397 A1 | * | 2/2022 | |

OTHER PUBLICATIONS

AcuityControls, "SensorView Manual," Nov. 3, 2015, (123 Pages).
Chang et al., "Microprocessor Applications and Building Control Systems to Achieve Energy Conservation," U.S. Department of Commerce and National Bureau of Standards, Jul. 1980, (54 pages).
Density, "Introducing Density Open Area" website: https://www.density.io/, dated Oct. 8, 2020 (7 Pages).
Garni, "Movement Direction and Distance Classification Using a Single PIR Sensor," in IEEE Sensors Letters, vol. 2, No. 1, Mar. 2018, pp. 1-4.
Ge, "Lightsweep Lighting Control System," Product Literature, Dec. 8, 2015, (12 Pages).
Haltian, "Thingsee PRESENCE" webpage: https://haltian.com/product/thingsee-presence/, publicly available at least as early as Nov. 10, 2020 (2 Pages).
Jiang et al., "Residential House Occupancy Detection: Trust-Based Scheme Using Economic and Privacy-Aware Sensors," in IEEE Internet of Things Journal, vol. 9, No. 3, Feb. 1, 2022, pp. 1938-1950.
Johnson Controls, "Metasys® for Validated Environments (MVE)," Product Bulletin, Dec. 15, 2001, (13 pages).
Lighting Answers, "Controlling Lighting with Building Automation Systems," vol. 4, No. 1, May 1997, <https://www.lightingassociates.org/i/u/2127806/f/tech_sheets/Lighting_Control.pdf>, (8 pages).
Lutron, "Quantum Unlimited Capability for High-Performance Buildings," Product Literature, P/N 367-1321, Apr. 2018, (20 Pages).
Lutron, "What is Lighting Control System", Product Literature 366-396h, Publicly available prior to Nov. 19, 2020, (19 Pages).
Occupancy Lights, Social Distancing Technology, Powerpoint Page, Publicly available at least as early as Nov. 10, 2020.
Perra et al., "Monitoring Indoor People Presence in Buildings Using Low-Cost Infrared Sensor Array in Doorways", Sensors 2021,21,4062., Published Jun. 12, 2021 (19 Pages).
Shankar et al., "Human-tracking systems using pyroelectric infrared detectors", Optical Engineering 45(10), Oct. 2006, (10 Pages).
Tooshlights, "Small upgrade. Big improvement, How it works", Copyright 2021 product brochure, (6 Pages).
Tooshlights, Product website: https://tooshlights.com/products/, Copyright 2021, (11 Pages).
Trane, "Tracer™ SC System Controller for Tracer Building Automated Systems," Product Catalog, P/N BAS-PRC031-EH, Jun. 10, 2013, (27 Pages).
Wang et al., "A Lightweight People Counting Approach for Smart Buildings," 2021 13th International Conference on Wireless Communications and Signal Processing (WCSP), pp. 1-5.
Wiatrowski, "Microprocessor Restroom Robot," Computer Design The Magazine of Digital Electronics, Apr. 1977, pp. 98-100, (3 pages).
Yang et al. "A novel low-cost and small-size human tracking system with pyroelectric infrared sensor mesh network," Infrared Physics & Technology, vol. 63, Mar. 2014, pp. 147-156.
Yun et al., "Human Movement Detection and Identification Using Pyroelectric Infrared Sensors" Sensors 14, No. 5, website: https://doi.org/10.3390/s 140508057, Pubhshed May 4, 2014, pp. 8057-8081.

* cited by examiner

SMART AND CLOUD CONNECTED DETECTION MECHANISM AND REAL-TIME INTERNET OF THINGS (IOT) SYSTEM MANAGEMENT

BACKGROUND

Water leaks in buildings, especially those that go unnoticed for periods of time, wreak havoc in buildings. The leaks typically cause damage and potentially harm to occupants of the building.

SUMMARY

In the field of facility or building management, there is a desire to manage the performance of an Internet of Things (IoT) architecture of fixtures. Examples of such IoT enabled fixtures include faucets, flush valves, hand dryers, floor drains, air or room quality sensors, backflow preventers, bottle fillers, pressure sensors, leak detection sensors, occupancy detection sensors, resource dispensers (e.g., a soap dispenser, a sanitizer dispenser, a room deodorizer dispenser, a paper tower dispenser), and the like.

Accordingly, embodiments of the present disclosure are generally directed to systems for management of IoT enabled fixtures. More particularly, embodiments of the present disclosure are directed to fixture management systems that integrate with building management solutions (BMS) (e.g., building automation and control network (BACnet) servers, computing devices, and the like) and are employed to, for example, collect fixture usage data, determine predictive maintenance, provide alerts, and provide commands in real-time to the network of integrated IoT enabled fixtures. Embodiments described herein include an IoT architecture of fixtures that communicate via endpoint devices and facility gateways with a cloud network (e.g., a cloud server). In some embodiments, the cloud network transmits the fixture data to a BACnet gateway device (e.g., through Long Range (LoRa) wide area network (WAN) radio frequency (RF) communication protocols). In some embodiments, the BACnet gateway device converts the fixture data, which is provided for display on a BACnet dashboard.

For example, sensor(s) may monitor water levels in facilities within the building. The sensors may be disposed at various heights from the ground to indicate a water level height. In some embodiments, the described fixture management system generates alerts determined based on the water level reaching sensors at the various heights. For example, an alert may be generated indicating that a leak has occurred due to the water level reaching a sensor height and a shut-off signal may be transmitted to a water inlet within the facility that is causing the leak.

In some embodiments, an alert (e.g., an indication) may be transmitted to a remote device to alert a building manager that a leak occurred, and a shut-off signal was transmitted to the water inlet. In some embodiments, an IoT enabled valve and drain may be in proximity to the leak and may be controllable to open to drain the water. For example, if the water level reaches a predetermined sensor height, the valve may open so water may escape via the drain.

In one aspect, disclosed herein, are fixtures for flooding detection that includes a communication interface; a processor; and a computer-readable storage media coupled to the processor and having instructions stored thereon which, when executed by the processor, cause the processor to perform operations comprising: receiving, from a first sensor, a first signal indicative of a water level at a location within a facility, determining, based on the first signal, the water level at the location within the facility, determining a shut-off condition based on the water level at the location within the facility reaching a first predetermined height, and transmitting, via the communication interface, a shut-off signal to at least one water inlet at the location within the facility.

In another aspect, disclosed herein, are servers configured to detect flooding, the server comprising: a communication interface configured to facilitate communication between a fixture and one or more devices which execute an application; a memory configured to store instructions; and a processor coupled to the memory and the communication interface, the processor executing flooding detection in conjunction with the instructions stored in the memory, wherein the instructions include: receiving, from a first sensor, a first signal indicative of a water level at a location within a facility, determining, based on the first signal, the water level at the location within the facility, determining a shut-off condition based on the water level at the location within the facility reaching a first predetermined height, and transmitting, via the communication interface, a shut-off signal to at least one water inlet at the location within the facility.

In another aspect, disclosed herein, are flooding detection systems comprising a fixture; a first sensor communicatively coupled to the fixture; and a server, wherein the server comprises: a communication interface configured to facilitate communication between the fixture and one or more devices which execute an application; a memory configured to store instructions; and a processor coupled to the memory and the communication interface, the processor executing flooding detection in conjunction with the instructions stored in the memory, wherein the instructions include: receiving, from the first sensor, a first signal indicative of a water level at a location within a facility, determining, based on the first signal, the water level at the location within the facility, determining a shut-off condition based on the water level at the location within the facility reaching a first predetermined height, and transmitting, via the communication interface, a shut-off signal to at least one water inlet at the location within the facility.

It is appreciated that methods in accordance with the present disclosure can include any combination of the aspects and features described herein. That is, methods in accordance with the present disclosure are not limited to the combinations of aspects and features specifically described herein, but also may include any combination of the aspects and features provided.

The details of one or more implementations of the present disclosure are set forth in the accompanying drawings and the description below. Other features and advantages of the present disclosure will be apparent from the description and drawings, and from the claims.

BRIEF DESCRIPTION OF THE DRAWINGS

A better understanding of the features and advantages of the present subject matter will be obtained by reference to the following detailed description that sets forth illustrative embodiments and the accompanying drawings of which.

DETAILED DESCRIPTION

Figure 1:
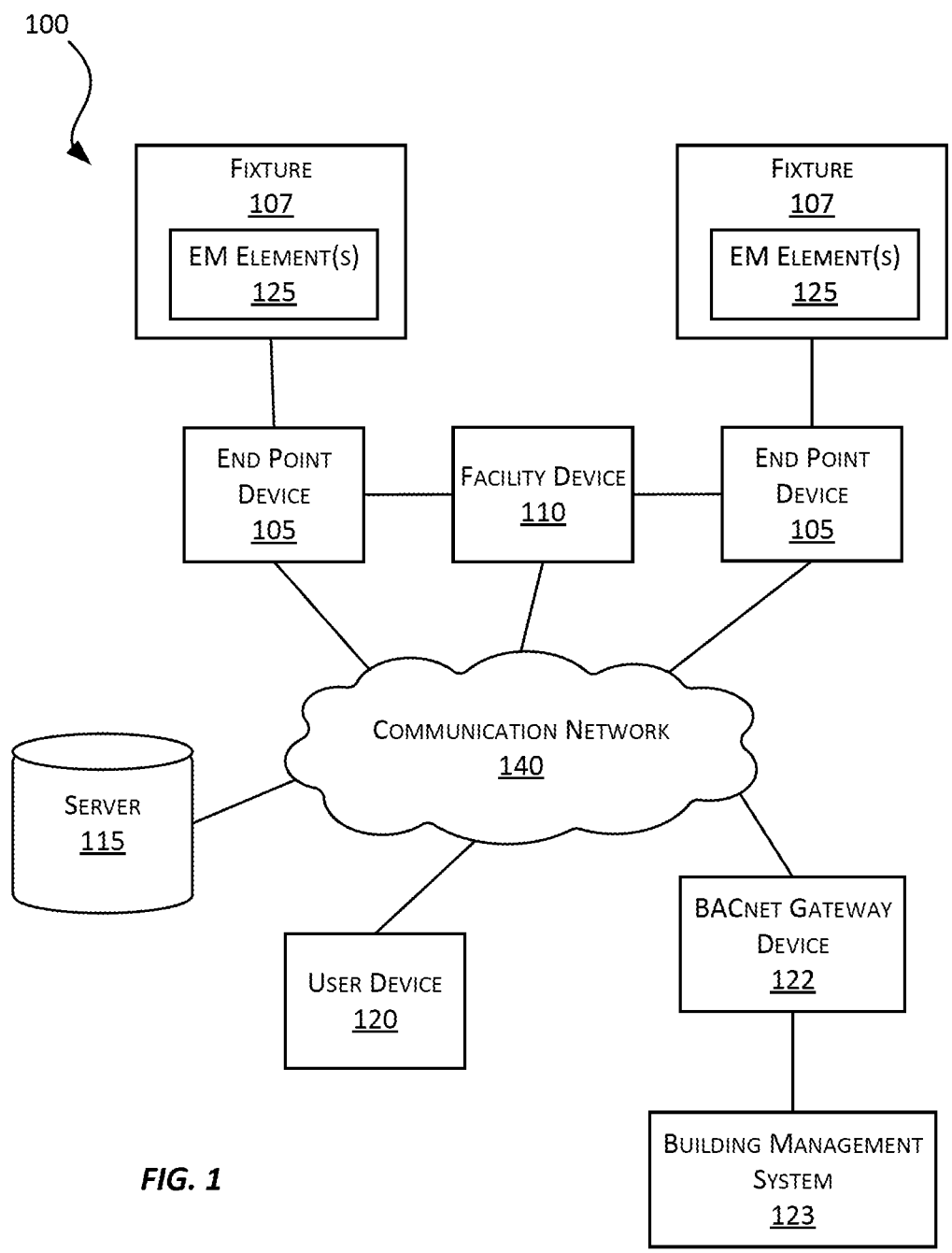
FIG. 1 depicts a non-limiting exemplary embodiment of a system for monitoring and managing a facility having a plurality of end point devices that can be employed to execute implementations of the present disclosure.

Before any embodiments of the disclosure are explained in detail, it is to be understood that the disclosure is not limited in its application to the details of embodiment and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limiting. The use of "including," "comprising" or "having" and variations thereof herein is meant to encompass the items listed thereafter and equivalents thereof as well as additional items. The terms "mounted," "connected" and "coupled" are used broadly and encompass both direct and indirect mounting, connecting and coupling. Further, "connected" and "coupled" are not restricted to physical or mechanical connections or couplings, and can include electrical or hydraulic connections or couplings, whether direct or indirect.

It should also be noted that a plurality of hardware and software-based devices, as well as a plurality of different structural components may be used to implement the implementations. In addition, implementations may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one implementation, the electronic based aspects of the disclosure may be implemented in software (for example, stored on non-transitory computer-readable medium) executable by one or more processors. As such, it should be noted that a plurality of hardware and software-based devices, as well as a plurality of different structural components may be utilized to implement various implementations. It should also be understood that although certain drawings illustrate hardware and software located within particular devices, these depictions are for illustrative purposes only. In some implementations, the illustrated components may be combined or divided into separate software, firmware and/or hardware. For example, instead of being located within and performed by a single electronic processor, logic and processing may be distributed among multiple electronic processors. Regardless of how they are combined or divided, hardware and software components may be located on the same computing device or may be distributed among different computing devices connected by one or more networks or other suitable communication links.

Embodiments of the present disclosure are generally directed to systems for determining and executing operations for fixtures deployed throughout facility. More particularly, embodiments of the present disclosure are directed to systems for monitoring fixtures deployed throughout a facility to detect a leak in a facility and transmitting a shut-off signal to a water inlet that causes the leak.

Accordingly, described herein, in certain embodiments, are fixtures comprising: a communication interface; a processor; and a computer-readable storage media coupled to the processor and having instructions stored thereon which, when executed by the processor, cause the processor to perform operations comprising: receiving, from a first sensor, a first signal indicative of a water level at a location within a facility, determining, based on the first signal, a water level at the location within the facility, determining a shut-off condition based on the water level at the location within the facility reaching a first predetermined height, and transmitting, via the communication interface, a shut-off signal to at least one water inlet at the location within the facility.

Also described herein, in certain embodiments, is a server configured to detect flooding. The server comprises: a communication interface configured to facilitate communication between a fixture and one or more devices which execute an application; a memory configured to store instructions; and a processor coupled to the memory and the communication interface. The processor executing flooding detection in conjunction with the instructions stored in the memory, wherein the instructions include: receiving, from a first sensor, a first signal indicative of a water level at a location within a facility, determining, based on the first signal, a water level at the location within the facility, determining a shut-off condition based on the water level at the location within the facility reaching a first predetermined height, and transmitting, via the communication interface, a shut-off signal to at least one water inlet at the location within the facility Also described herein, in certain embodiments, a flooding detecting system. The flooding detecting system comprises: a fixture; a first sensor communicatively coupled to the fixture; and a server. The server comprises: a communication interface configured to facilitate communication between the fixture and one or more devices which execute an application; a memory configured to store instructions; and a processor coupled to the memory and the communication interface, the processor executing flooding detection in conjunction with the instructions stored in the memory. The instructions include receiving, from the first sensor, a first signal indicative of a water level at a location within a facility, determining, based on the first signal, a water level at the location within the facility, determining a shut-off condition based on the water level at the location within the facility reaching a first predetermined height, and transmitting, via the communication interface, a shut-off signal to at least one water inlet at the location within the facility Definitions Unless otherwise defined, all technical terms used herein have the same meaning as commonly understood by one of ordinary skill in the art to which the present subject matter belongs. As used in this specification and the appended claims, the singular forms "a," "an," and "the" include plural references unless the context clearly dictates otherwise. Any reference to "or" herein is intended to encompass "and/or" unless otherwise stated.

As used herein, the term "real-time" refers to transmitting or processing data without intentional delay given the processing limitations of a system, the time required to accurately obtain data and images, and the rate of change of the data and images. In some examples, "real-time" is used to describe the presentation of information obtained from components of embodiments of the present disclosure.

FIG. 1 depicts an exemplary embodiment of a system 100 that can be employed to execute implementations of the present disclosure. The example system 100 may be employed to, for example, monitor and manage a facility such as a building or one or more rooms within a building. As depicted, the system 100 includes a plurality of endpoint devices 105 (collectively referred to herein as "the endpoint devices 105" and individually as "an endpoint device 105"), a plurality of fixtures 107 (collectively referred to herein as "the fixtures 107" and individually as "a fixture 107"), a facility device 110 (for example, a gateway), a server 115 (for example, cloud server), a user device 120, a BACnet gateway device 122, and a building management system (BMS) 123. In some embodiments, the system 100 includes fewer, additional, or different components than depicted in FIG. 1. For example, the system 100 may include multiple facility devices 110, servers 115, user devices 120, BACnet gateway devices 122, or a combination thereof. Additionally, the system 100 may include any number of endpoint devices 105 and/or fixtures 107 and the two endpoint devices and fixtures depicted in FIG. 1 are purely for illustrative purposes. In some embodiments, one or more of the components of the system 100 are distributed among multiple devices, combined within a single device, or a combination thereof. As one example, in some embodiments, one or more of the endpoint devices 105 may be incorporated within a fixture 107 as a single device. Accordingly, in some embodiments, the functionality described as being performed by the endpoint device 105 (or a portion thereof) may be performed by a fixture 107 (including built-in or attached similar hardware and software components as the endpoint device 105).

In some embodiments, the endpoint devices 105, the fixtures 107, the facility device 110, the server 115, the user device 120, the BACnet gateway device 122, and the BMS 123 communicate over one or more communication networks 140. Portions of the communication networks 140 may be implemented using a wide area network (WAN), such as the Internet or a LoRa system, a local area network (LAN), such as a Bluetooth™ network or Wi-Fi, and combinations or derivatives thereof. In some embodiments, the communication network 140 includes a telecommunication network or data network. In some embodiments, the communication network 140 can be accessed over a wired or a wireless communications link, such as a network gateway.

In some embodiments, the communication network 140 includes a network of physical objects (or IoT) with mesh and start topological structures (e.g., Narrowband IoT (NBIOT), Long Range (LoRa), ZigBee, general package radio service (GPRS), and Long-Term Evolution (LTE) category M1 (Cat1)). In some embodiments, the physical objects forming the communication network 140 include one or more components of the system 100. In some embodiments, one or more components of the system 100 communicate via LoRa or LoRaWAN networking protocols (for example, the endpoint device 105 and the facility device 110). In some embodiments, protocols can be adopted within the network 210 for specific applications and environments. For example, mesh topology can be used for IOTs of a smaller scale. Moreover, a mesh topology generally supports longer distance data transmission and can be used for IOTs of a larger scale. Using such networking protocols provides for secure, encrypted communication of data without use of a customer or building network. Accordingly, use of such networking protocols may isolate an endpoint device 105 (or other component of the system 100) from a customer or building network.

Accordingly, in some embodiments components of the system 100 can be configured to communicate via Bluetooth, Wi-Fi, Zigbee, LTE/Cellular, wired ethernet, RS485/RS232, or the like. As one example, the endpoint devices 105 may communicate via LoRa with the facility device 110. In some embodiments, one or more components of the system 100 communicate directly as compared to through the communication network 140. For example, the endpoint devices 105 may communicate directly with the facility device 110. Also, in some embodiments, the components of the system 100 communicate through one or more intermediary devices (not shown in FIG. 1).

In some embodiments, the fixture 107 provides a water management solution, a building maintenance solution, a building operation solution, a building management solution, or a combination thereof. Example embodiments of fixture 107 include a water inlet device such as a faucet, a flushometer, a flush valve, a soap dispenser, a handwashing system, a water service line monitor, a backflow preventer, a floor drain, a hand dryer, a pressure sensor, a water use sensor, a flow sensor, a valve sensor, a lavatory, a toilet, a urinal, a water closet, a bottle and glass filler, a drain (e.g., a sink drain, a roof drain or floor drain network, and the like), a drinking water fountain, an air quality monitor, an air or room quality sensor (e.g., a service request or product replenishment request button or other suitable activator), a backflow preventer, a leak detection device, an occupancy detection sensor, a resource dispenser (e.g., a soap dispenser, a sanitizer dispenser, a room deodorizer dispenser, a paper tower dispenser), a fire protection device or fixture (e.g., a smart fire protection device or fixture), a waste receptacle (e.g., a garbage can or bin), a door handle, a thermal mixing valve, a contamination monitor (e.g., a *legionella* contamination sensor), and the like.

As depicted in FIG. 1, each of the fixtures 107 is associated with one or more EM elements 125. In some embodiments, the EM elements 125 are configured to monitor or influence the operation of the fixture 107. Example embodiments of fixture 107 include an EM element 125 including a water level sensor, an actuator, a capacitive sensor, a weight sensor, an ultrasonic sensor, a resistive sensor, a thermal sensor, a magnetic sensor, a flow sensor, a position sensor, a proximity sensor, a thermocouple, and the like. In some embodiments, the EM elements 125 include an electrical only element, a mechanical only element, or a combination of an electrical and a mechanical element(s). In some embodiments, the EM elements 125 include a single-piece component or multiple components.

As an example, in some embodiments, the fixture 107 is a leak detection device (such as, leak detection device 452 (FIG. 5)) including water level sensors (e.g., as a first EM element 125, a second EM element 125, and a third EM element 125) (such as, water level sensors 455A, 455B, 455C) configured to detect the presence of water at various heights. Alternatively, in some embodiments, each EM element (e.g., the first EM element 125, the second EM element 125, and the third EM element 125) is associated with its own fixture 107. In some embodiments, a first water level sensor is located a first predetermined height off the ground and senses the presence of water. When the water level sensor senses the presence of water, the water level sensor sends a "LEAK DETECTED" signal to the fixture 107. In some embodiments, when the fixture 107 determines that the water has reached the first predetermined height as indicated by the "LEAK DETECTED" signal, the fixture may transmit a "SHUT-OFF" signal to a water inlet device (e.g., a second fixture 107), including an actuator (e.g., as a fourth EM element 125) (e.g., a valve actuating solenoid), closing the actuator and thereby ceasing the flow of water from the actuator.

In some embodiments, when the fixture 107 transmits the "SHUT-OFF" signal to the water inlet device, the fixture may transmit a first indication and a second indication to the user device 120. For example, the first indication may indicate that the water level has reached the first predetermined height and the second indication may indicated that the "SHUT-OFF" signal was transmitted to the water inlet device. In some embodiments, prior to transmitting the first indication and the second indication, the fixture 107 may receive a user input from the user device 120. The user input may trigger a shut off of the water inlet device. For example, the user device 120 may transmit the "SHUT-OFF" signal to the water inlet device instead of the fixture 107 automatically transmitting the "SHUT-OFF" signal to the water inlet device. In some embodiments, the fixture 107 may determine that the water inlet device did not shut off (e.g., after the "SHUT-OFF" signal was transmitted to the actuator) based on a "ON" signal from the water inlet device. The fixture 107 may then provide an alert to the user device 120. For example, the alert may suggest that personnel should be dispatched the area experiencing a leak to manually shut off the water inlet device by manually closing the actuator. In some embodiments, when the fixture 107 determines that the water has reached a second predetermined height off the ground (e.g., as sensed by the second EM element 125), the water level sensor sends a "SEVERE LEAK DETECTED" signal to the fixture 107 and the fixture 107 determines that a second actuator (e.g., a fifth EM element 125) (e.g., a valve actuating solenoid) of a floor drain (e.g., a third fixture 107) should be opened to drain the water. The fixture 107 may transmit an "OPEN" signal to the floor drain triggering the second actuator to open and water to flow down the floor drain In some embodiments, the fixture 107 may receive temperature data and pressure data from the water inlet device prior to the actuator closing. The fixture 107 may determine a discrepancy/variation in at least one of the temperature data and pressure data and provide an alert to the user device 120 indicating the discrepancy/variation in at least one of the temperature data and pressure data. In some embodiments, the fixture 107 may receive a "LEAK DETECTED" signal from a roof drain (e.g., a fourth fixture 107) including a third actuator (e.g., as a sixth EM element 125) (e.g., a valve actuating solenoid) and determine that the roof drain is experiencing one of an overflow condition and a leak condition. Based on the fixture 107 determining that the roof drain is experiencing one or an overflow condition and a leak condition, the fixture 107 may determine that the roof drain caused the leak. In some embodiments, the fixture 107 may provide a marker to the user device 120 marking a location of the fixture (e.g., the water inlet device and/or the roof drain) that caused the leak.

As depicted in FIG. 1, in some embodiments, the endpoint device 105 includes a communication link with at least one fixture 107. In some embodiments, the endpoint devices 105 span multiple facilities, locations, rooms, and the like. In some embodiments, each of the endpoint devices 105 is associated with (e.g., located within) the same facility (e.g., a restroom). In some embodiments, the each of the endpoint devices 105 is associated with multiple facilities. As an example, a first endpoint device may be associated with a first facility and a second endpoint device may be associated with a second different facility that is either in the same building as the first facility or in an entirely different building. In some embodiments, a single endpoint device 105 is associated with each of the fixtures (e.g., the leak detection device, the water inlet device, the floor drain, and the roof drain). However, in other embodiments, the each of the endpoint devices 105 is associated with each individual fixture (e.g., the leak detection device, the water inlet device, the floor drain, or the roof drain). For example, a first endpoint device may be associated with the leak detection device (as the fixture 107) and a second endpoint device may be associated with the water inlet device (as the second fixture 107).

Figure 2:
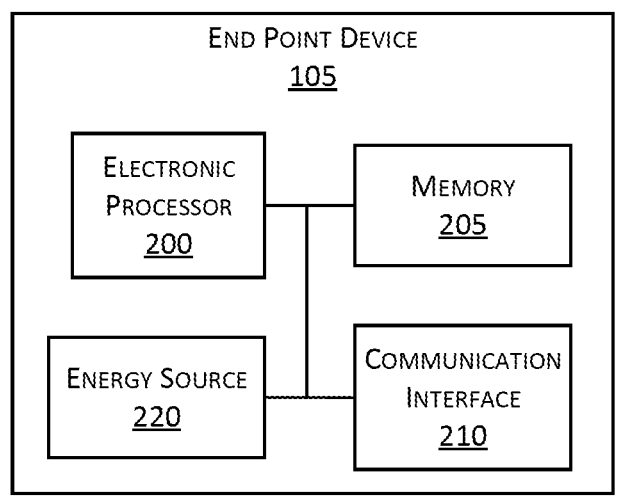
FIG. 2 depicts a non-limiting exemplary embodiment of an end point device.

FIG. 2 depicts an exemplary embodiment of the endpoint device 105. As depicted, the endpoint device 105 includes an electronic processor 200, a memory 205, a communication interface 210, and an energy source 220. In some embodiments, the electronic processor 200, the memory 205, the communication interface 210, and the energy source 220 communicate wirelessly, over one or more communication lines or buses, or a combination thereof. In some embodiments, one or more components of the endpoint device 105 are distributed among multiple devices, integrated into a single device, or a combination thereof. In some embodiments, the endpoint device 105 perform additional functionality other than the functionality described herein. In some embodiments, the endpoint device 105 include additional, different, or fewer components than those illustrated in FIG. 2. As an example, in some embodiments, the endpoint device 105 includes multiple energy sources 220. As another example, in some embodiments, the endpoint device 105 includes one or more expansion ports allowing for future expansion of the endpoint device 105. As such example, additional EM elements of a fixture 107 may be connected to the endpoint device 105 via the one or more of the expansion ports.

In some embodiments, the communication interface 210 allows the endpoint device 105 to communicate with devices external to the endpoint device 105. For example, as depicted in FIG. 1, the endpoint device 105 may communicate with the fixture 107 (or an EM element 125 thereof), the facility device 110, the server 115, the user device 120, the BACnet gateway device 122, the BMS 123, or a combination thereof through the communication interface 210. In some embodiments, the communication interface 210 includes a port for receiving a wired connection to an external device (e.g., a universal serial bus (USB) cable), a transceiver for establishing a wireless connection to an external device (e.g., over one or more communication networks 140, such as the Internet; LAN; a WAN, such as a LoRa network or system, and so forth), or a combination thereof. As an example, in some embodiments, the communication interface 210 includes a port for receiving a wired connection between the facility device 110 and an EM element 125 of a corresponding fixture 107. As another example, in some embodiments, the communication interface 210 includes a radio or transceiver for establishing a wireless connection, over a LoRa system or network, between the endpoint device 105 and the facility device 110.

In some embodiments, the electronic processor 200 includes a microprocessor, an application-specific integrated circuit (ASIC), or a suitable electronic device for processing data. In some embodiments, the memory 205 includes a non-transitory, computer-readable storage medium. In some embodiments, the electronic processor 200 is configured to access and execute computer-readable instructions (software) stored in the memory 205. In some embodiments, the software includes firmware, one or more applications, program data, filters, rules, one or more program modules, and other executable instructions. For example, in some embodiments, the software includes instructions and associated data for performing a set of functions, including the methods described herein. For example, in some embodiments, the electronic processor 200 is configured to enable management or monitoring of the operation of the corresponding fixture 107 either directly or indirectly (e.g., via the EM element(s) 125 of the corresponding fixture 107). In some embodiments, the electronic processor 200 enables management or monitoring of the operation of a corresponding fixture 107 by receiving fixture data from the fixtures 107, converting the fixture data for transmission, and enabling transmission of the converted data to, for example, the facility device 110, the server 115, the user device 120, the BACnet gateway device 122, another component of the system 100, or a combination thereof.

In some embodiments, the electronic processor 200 is configured to interact with and collect data (either directly or indirectly) regarding an operation of a fixture 107 (as fixture data) via the EM elements 215. In some embodiments, the endpoint device 105 is configured to remain in a sleep mode (or deep sleep mode) until an action or operation is detected with respect to a fixture 107 associated with the endpoint device 105 (e.g., detecting the presence of water). In response to detecting the action or operation, the endpoint device 105 may then wake-up to receive fixture data, convert the fixture data for transmission, and transmit the fixture data (in a minimum power consumption mode) to, for example, the facility device 110, the server 115, the user device 120, another component of the system 100, or a combination thereof. This results in optimized battery life for the product. To further aid in the power optimization, in some embodiments, the transmission of converted fixture data (e.g., as one or more data packets) from the endpoint device 105 to the facility device 110 occurs through an adaptable data rate that automatically selects an available channel.

As depicted in FIG. 2, the endpoint device 105 includes the energy source 220. In some embodiments, the energy source 220 powers one or more components of the endpoint device 105, such as the electronic processor 200. In some embodiments, the energy source 220 is a battery, such as an energy efficient battery, a re-chargeable battery, a lithium-ion battery, a replaceable battery, and the like. As an example, in some embodiments the energy source 220 is a standard battery (e.g., an AAA, AA, C, or D sized batteries). As noted above, in some embodiments, the endpoint device 105 includes multiple energy sources 220 (e.g., a first energy source, a second energy source, and the like). In such embodiments, the multiple energy sources 220 are the same type, different types, or a combination thereof. As an example, in some embodiments, the endpoint device 105 includes three AA batteries as the energy sources 220. In some embodiments, the endpoint device 105 is coupled to and receives power from a power source associated with the facility, the building, another component, and the like.

In some embodiments, one or more components of the system 100 are present in a completed fixture 107 (e.g., a water level sensor in a leak detection device, an actuator in a water inlet device, an actuator in a floor drain, an actuator in a roof drain, etc.). In such embodiments, additional components may be retrofit onto the existing fixture 107. Accordingly, in some embodiments, the endpoint device 105 (or components thereof) may be retrofit onto or into the existing fixture 107. As an example, in some embodiments, a transmitter, a receiver, a transceiver, or a combination thereof (as part of the communication interface 210), the electronic processor 200, the energy source 220, or a combination thereof are mounted in the plumbing immediately upstream of a particular fixture 107. In other examples, in some embodiments, the retrofit includes updating firmware in the existing device. In still other examples, in some embodiments, the retrofit includes integrating elements into a previously existing fixture 107.

Figure 3:
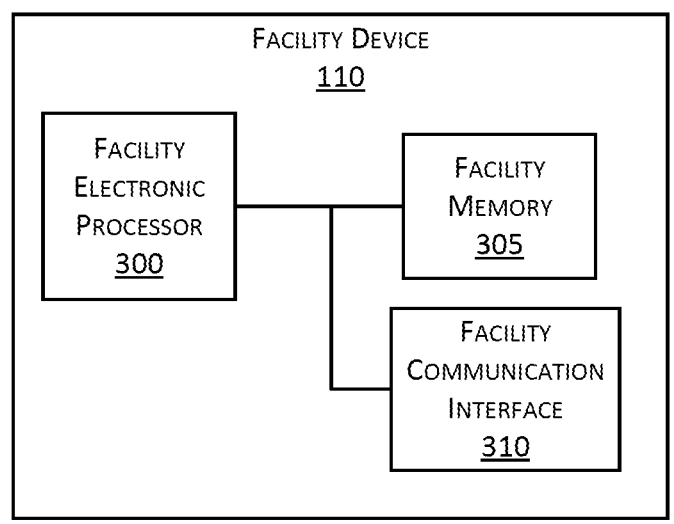
FIG. 3 depicts a non-limiting exemplary embodiment of a facility device.

FIG. 3 depicts an exemplary embodiment of the facility device 110. As depicted, the facility device 110 includes a facility electronic processor 300, a facility memory 305, and a facility communication interface 310. In some embodiments, the facility electronic processor 300, the facility memory 305, and the facility communication interface 310 communicate wirelessly, over one or more communication lines or buses, or a combination thereof. In some embodiments, the facility device 110 includes additional, different, or fewer components than those illustrated in FIG. 3. For example, in some embodiments, the facility device 110 includes a human-machine interface for interacting with a user. In some embodiments, the human machine interface includes one or more input devices, one or more output devices, or a combination thereof. In some embodiments, one or more components of the facility device 110 are distributed among multiple devices, integrated into a single device, or a combination thereof. In some embodiments, the functionality (or a portion thereof) described herein as being performed by the facility device 110 is be distributed among multiple devices.

In some embodiments, the facility device 110 communicates with external devices via the facility communication interface 310. For example, in some embodiments and as illustrated in FIG. 1, the facility device 110 communicates with the endpoint devices 105, the fixtures 107, the server 115, the user device 120, the BACnet gateway device 122, or a combination thereof through the facility communication interface 310. In some embodiments, the facility communication interface 310 includes a port for receiving a wired connection (e.g., a USB cable) to an external device, a transceiver for establishing a wireless connection (e.g., over one or more communication networks 140, such as the Internet; a LAN; or a WAN, such as a LoRa system) to an external device, or a combination thereof.

In some embodiments, the facility electronic processor 300 is configured to access and execute computer-readable instructions ("software") stored in the facility memory 305. In some embodiments, the software includes firmware, one or more applications, program data, filters, rules, one or more program modules, and other executable instructions. For example, in some embodiments, the software includes instructions and associated data for performing a set of functions, including the methods described herein.

In some embodiments, the facility device 110 serves as a gateway or intermediary device that receives data and forwards the data to another component for processing. As an example, in some embodiments, the facility device 110 receives fixture data from the electronic processors 200 of one or more of the endpoint devices 105 and forwards the data to another component for processing, such as the server 115, the user device 120, or a combination thereof. Accordingly, in some embodiments, the facility device 110 forwards the data to a remote server (e.g., the server 115) for virtual processing. As another example, in some embodiments, the facility device 110 receives processed data (e.g., fixture data processed by the server 115) from a remote server (e.g., the server 115) and forwards the processed data to another component, such as the BACnet gateway device 122, for further processing. In such embodiments and as described in greater detail below, data may be converted from LoRa to BACnet. As noted above, in some embodiments, the functionality (or a portion thereof) performed by the facility device 110 may be performed by another remote device or server (not shown).

Returning to FIG. 1, as depicted, the server 115 and the user device 120 are computing devices, such as a desktop computer, a laptop computer, a tablet computer, a terminal, a smart telephone, a smart television, a smart wearable, or another suitable computing device that interfaces with a user. Although not depicted in FIG. 1, in some embodiments, the server 115 and the user device 120 include similar components as the facility device 110, such as an electronic processor (e.g., a microprocessor, an ASIC, or another suitable electronic device), a memory (e.g., a non-transitory, computer-readable storage medium), a communication interface (e.g., a transceiver) for communicating over the communication network 140. In some embodiments, the server 115 and the user device 120 include one or more additional communication networks or connections. In some embodiments, the server 115 and the user device 120 include one or more human machine interfaces.

In some embodiments, the server 115 includes multiple electronic processors, multiple memory modules, multiple communication interfaces, or a combination thereof. In some embodiments, the server 115 is a server-class hardware type device. In some embodiments, the functionality described herein as being performed by the server 115 may be performed in a distributed nature by a plurality of computing devices (or servers) located in various geographic locations. In some embodiments, server 115 includes computer systems using clustered computers and components to act as a single pool of seamless resources when accessed through the network 140. For example, such implementations may be used in data center, cloud computing, storage area network (SAN), and network attached storage (NAS) applications. In some embodiments, the server 115 is deployed using a virtual machine(s). For example, in some embodiments, the functionality described herein as being performed by the server 115 is performed by a plurality of computing devices included in a cloud computing environment.

In the server 115, is coupled to a at least one data store. In some embodiments, the data store is a repository for persistently storing and managing collections of data. Example data store that may be employed such as a database (e.g., lite weight database) as well as simpler store types, such as files, emails, and the like. In some embodiments, the data store includes a database, which may include a series of bytes or an organized collection of data that is managed by a database management system (DBMS). In some embodiments, the data store is provided via a distributed ledger (e.g., a blockchain).

In some embodiments, the server 115 is configured to monitor and manage one or more facilities (e.g., individual restrooms or entire buildings), which includes the fixtures 107 therein. In some embodiments, the server 115 (via an electronic processor of the server 115) receives fixture data from the facility device 110. In response to receiving the fixture data, in some embodiments, the server 115 processes the fixture data and determines usage information or patterns associated with the one or more facilities (and included fixtures 107 thereof). In some embodiments, the server 115 stores the usage information or patterns in, for example, a data store that uses the memory of the server 115. In some embodiments, the server 115 transmits the usage information or patterns to a remote device for storage.

In some embodiments, access data associated with one or more facilities (e.g., the usage information or patterns determined by the server 115) is provided to users via the user device 120. In some embodiments the user device 120 is employed by an end user (e.g., a facility entity) to monitor and manage a facility (e.g., a single restroom or multiple restrooms in a building), a building, one or more fixtures 107 of a facility or building, or a combination thereof. For example, in some embodiments, a user accesses and interacts with the data determined by the server 115 to view and understand usage patterns, which may provide insights into, for example, how to optimize cleaning and maintenance schedules; whether there is a need for additional facilities, endpoint devices; and the like. For example, in some embodiments, to communicate with the server 115 (e.g., the usage information or patterns determined by the server 115), the user device 120 stores a browser application or a dedicated software application executable by an electronic processor for interacting with the server 115. As another example, in some embodiments, a user may receive alerts directly from the server 115 that are displayed on the user device 120. In some embodiments, the user may interact with the user device 120 to send signals to the fixtures 107, via the server 115.

In some embodiments, the BMS 123 is a building management or automation system that is associated with a structure (e.g., a building), one or more facilities within the building, or a combination thereof. In some embodiments, the BMS 123 is associated with multiple structures associated with a single location (e.g., an airport campus, a corporation's campus, a university or educational campus, and the like). However, in other embodiments, the BMS 123 is associated with multiple structures associated with related locations. In some embodiments, the BMS 123 is a computer-based control system that is configured to control and monitor, for example, mechanical equipment or electrical equipment, associated with a structure. As an example, in some embodiments, the BMS 123 includes ventilation, lighting, power systems, fire systems, security systems, and the like. In some embodiments, the BMS 123, including the sub-systems included therein, communicate via BACnet communication protocol(s). As noted above, in some embodiments, the BMS 123 is associated with one or more vendors. As an example, in some embodiments, the BMS 123 includes a ventilation system associated with "Vendor A" and a security system associated with "Vendor B." In some embodiments, data associated with the BMS 123 is accessible to a user via a vendor specific dashboard (e.g., a BMS dashboard) that includes a browser application or dedicated software application provided by the respective vendor. In some embodiments, users can leverage the information provided via the BMS 123 to reduce downtime of devices and fixtures and schedule, for example, preventive and proactive maintenance and repair and replacement work.

In some embodiments, a user, via the BMS 123, can schedule operations for a fixture 107. In some embodiments, a user can schedule these operations for various time windows. In some embodiments, an endpoint device 105 that is associated with the designated fixture 107 receives operations from, for example, the BMS 123 or server 115, and schedules execution of the operations by the fixture 107 at the provided execution time(s). For example, in some embodiments, the BMS 123 or server 115 provide an endpoint device 105 operation parameters such as, for example, a start time (e.g., a timestamp that includes a date and time) to execute the operation (e.g., when to begin a purge), a length of time to continue the operation (e.g., how long to continue the purge), and a current time to synchronize an internal clock. In some embodiments, the endpoint device 105 employs an internal RTC to wake up at the appointed time and provide control commands the designated fixture 107 for performing the scheduled operation. For example, in some embodiments, an endpoint device 105 receives an operation for purging a fixture. The operation may include parameters such as, for example, when to begin the purge (e.g., the date and time) and how long to conduct the purge (e.g., a number of seconds). In some embodiments, the endpoint device 105 schedules (e.g., via the memory 205) the operation based on the parameters, and at the schedule time, provides commands to the designated fixture 107 to execute the operation (e.g., a command to turn on followed by a command to turn off after the allot purge time). In some embodiments, the endpoint device 105 provides a completed message along with any other pertinent information (e.g., any error conditions) to the BMS 123 or server 115 after the operation is completed by the designated fixture 107.

In some embodiments, the BMS 123 may provide a first indication and a second indication that is transmitted by the fixture 107 (e.g., in the case that the server 115 may be down or unavailable). For example, the first indication may indicate that the water level has reached the first predetermined height and the second indication may indicated that the "SHUT-OFF" signal was transmitted to the water inlet device. In some embodiments, prior to transmitting the first indication and the second indication, the fixture 107 may receive a user input from the BMS 123. The user input may trigger a shut off of the water inlet device. For example, the BMS 123 may transmit the "SHUT-OFF" signal to the water inlet device instead of the fixture 107 automatically transmitting the "SHUT-OFF" signal to the water inlet device. In some embodiments, the fixture 107 may determine that the water inlet device did not shut off (e.g., after the "SHUT-OFF" signal was transmitted to the actuator) based on a "ON" signal from the water inlet device. The fixture 107 may then provide an alert to the BMS 123. For example, the alert may suggest that personnel should be dispatched the area experiencing a leak to manually shut off the water inlet device by manually closing the actuator.

In some embodiments, the fixture 107 may receive temperature data and pressure data from the water inlet device prior to the actuator closing. The fixture 107 may determine a discrepancy/variation in at least one of the temperature data and pressure data and provide an alert to the BMS 123 indicating the discrepancy/variation in at least one of the temperature data and pressure data. In some embodiments, the fixture 107 may receive a "LEAK DETECTED" signal from a roof drain (e.g., a fourth fixture 107) including a third actuator (e.g., as a sixth EM element 125) (e.g., a valve actuating solenoid) and determine that the roof drain is experiencing one of an overflow condition and a leak condition. Based on the fixture 107 determining that the roof drain is experiencing one or an overflow condition and a leak condition, the fixture 107 may determine that the roof drain caused the leak. In some embodiments, the fixture 107 may provide a marker to the BMS 123 marking a location of the fixture (e.g., the water inlet device and/or the roof drain) that caused the leak.

In some embodiments, the endpoint devices 105 periodically provide a request for current operations to the facility device 110 or the server 115. In such embodiments, the facility device 110 or the server 115 receive the scheduled operations from the BMS 123 and provide the operations to the designated endpoint devices 105 at the time of execution. In some embodiments, the endpoint devices 105 provide commands to the designated fixtures 107 to execute the operations when the operations are received. In some embodiments, the endpoint devices 105 provide a response to the facility device 110 or the server indicating receipt of an operation.

In some embodiments, when an endpoint device 105 cannot connect to a facility device 110 or the server 115 (e.g., the connection the network 140 is dropped), the endpoint device 105 sends a request for current operations to the facility device 110 or the server 115 once a network connection is reestablished. In some embodiments, the facility device 110 or the server 115 will periodically send an operation to a designated endpoint device 105 until a receipt message is received for the endpoint device 105 (e.g., when the endpoint device has reestablished a connection to the network 140).

In some embodiments, a user can group multiple fixtures 107 and schedule operations for the group. For example, in some embodiments the fixtures 107 are grouped based on usage (e.g., how frequently the device is activated) or location (e.g., in the same room, on the same floor, in the same building, connected to a common water supply, and the like). In some embodiments, the fixtures 107 can be placed in more than one group, and as such, the respective endpoint device(s) 105 is provided the operation for each the assigned groups. In some embodiments, the operations relate to maintenance, operational efficiency, downtime reduction, real-time monitoring, and the like, of the fixtures 107.

In some embodiments, the server 115 processes received fixture data to train (e.g., based on machine learning) a usage model for the endpoint devices 105. In some embodiments, the usage model is employed to determine, for example, future use of the fixtures 107, anomalies in usage, and maintenance (e.g., purge operations). In some embodiments, the BMS 123 provides analytic data determined based on the trained usage model to users via the dashboard. In some embodiments, the users can schedule operations for the fixtures 107 based on the provided usage data. In some embodiments, the users can provide, via the dashboard, a framework (e.g., rules) to the server 115, which are integrated into the trained usage model. In some embodiments, the server 115 processes the received fixture data through the integrated, trained usage model to determine operations for the fixtures 107. in some embodiments, the operations are provided to the respective endpoint device 105 associated with the designated fixture 107 via the network 140.

For example, in some embodiments, purge operations are scheduled for one of the fixtures via the dashboard or the server 115 based on the integrated, trained usage model. In some embodiments, the purge operations include parameters such as when to purge (e.g., the time of day), how long to purge, how frequently to purge (e.g., every N number of hours, every N number of days, and the like), and the like. In some embodiments, operations are provided to the endpoint devices via the facility device 110 (e.g., a LoRa gateway) based on, for example, a unique identifier associated with each of the endpoint devices 105 or the fixtures 107. In some embodiments, the endpoint devices 105 store the operations to execute (e.g., provide the appropriate commands to the designated fixture(s) 107) at the scheduled day/time.

As another example, in some embodiments, the EM elements 125 for a fixture 107 (e.g., a water inlet device) include sensors and mixing valves with various hot/cold temp adjustment options. In some embodiments, a building has multiple thermo mixing valves (TMVs) where temperature or pressure sensors are installed in the pipes. In some embodiments, the user provides temperature or pressure setting rules to the server 115 that are integrated into models trained with the fixture data received from the temperature sensors and pressure sensors. In some embodiments, the server 115 processes received fixture data through the integrated, trained models to determine operations for the EM elements 125 (e.g., the mixing valves) or alerts for the dashboard users (e.g., when a temperature range or pressure range exceeds an upper threshold, the operations may include ceasing the flow of water). In some embodiments, the dashboard is provided temperature or pressure status at various nodes at a desired frequency (e.g., daily, weekly, monthly) so that the user can take appropriate actions in real time. In some embodiments, based on the temperature or pressure range exceeding an upper or lower threshold, the water inlet device may send an alert to the server 115 to be sent to the user device 120 to notify the user.

Figure 4:
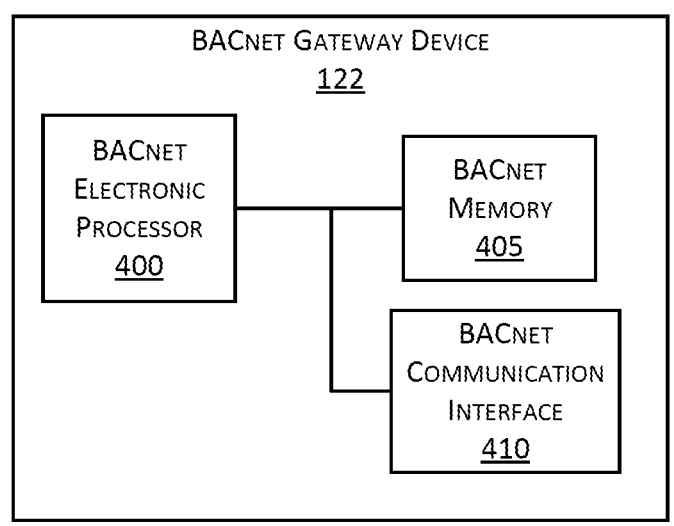
FIG. 4 depicts a non-limiting exemplary embodiment of a BACnet gateway device.

As depicted in FIG. 1, in some embodiments, the BMS 123 communicates with one or more components of the system 100 via the BACnet gateway device 122. The example embodiment of the BACnet gateway device 122 depicted in FIG. 4 includes a BACnet electronic processor 400, a BACnet memory 405, and a BACnet communication interface 410. In some embodiments, the BACnet electronic processor 400, the BACnet memory 405, and the BACnet communication interface 410 communicate wirelessly, over one or more communication lines or buses, or a combination thereof. In some embodiments, the BACnet gateway device 122 includes additional, different, or fewer components than those illustrated in FIG. 4. For example, in some embodiments, the BACnet gateway device 122 includes a human-machine interface for interacting with a user. In some embodiments, the human machine interface includes one or more input devices, one or more output devices, or a combination thereof. In some embodiments, one or more components of the BACnet gateway device 122 are distributed among multiple devices, integrated into a single device, or a combination thereof. In some embodiments, the BACnet gateway device 122 performs additional functionality other than the functionality described herein. In some embodiments, the functionality (or a portion thereof) described herein as being performed by the BACnet gateway device 122 is distributed among multiple devices.

In some embodiments, the BACnet communication interface 410 allows the BACnet gateway device 122 to communicate with devices external to the BACnet gateway device 122. For example, in some embodiments and as depicted in FIG. 1, the BACnet gateway device 122 communicates with the endpoint devices 105, the fixtures 107, the server 115, the user device 120, the BMS 123, or a combination thereof through the BACnet communication interface 410. In some embodiments, the BACnet communication interface 410 includes a port for receiving a wired connection to an external device (e.g., a USB cable and the like), a transceiver for establishing a wireless connection to an external device (e.g., the communication network 140), or a combination thereof.

In some embodiments, the BACnet electronic processor 400 is configured to access and execute computer-readable instructions ("software") stored in the BACnet memory 405. In some embodiments, the software includes firmware, one or more applications, program data, filters, rules, one or more program modules, and other executable instructions. For example, in some embodiments, the software includes instructions and associated data for performing a set of functions, including the methods described herein.

In some embodiments, the BACnet gateway device 122 serves as a gateway or intermediary device that receives data and forwards the data to another component for processing. As an example, in some embodiments, the BACnet gateway device 122 receives processed fixture data (as processed by the server 115) from the facility device 110 and converts the processed fixture data to a communication protocol, such as a BACnet communication protocol, associated with the BMS 123 (e.g., from LoRa to BACnet). In some embodiments, after converting the processed fixture data, the BACnet gateway device 122 forwards the converted fixture data to the BMS 123 (or another component of the system 100). In some embodiments, the BMS 123 enables a user of the BMS 123 to access and interact with the converted fixture data via the BMS dashboard, which may be specific to one or more vendors (as noted above). In some embodiments, the BACnet gateway device 122 receives the processed fixture data from another component of the system 100, such as the server 115 or the user device 120. Accordingly, in some embodiments, the BACnet gateway device 122 receives the processed fixture data directly from the server 115 (post-processing of the fixture data by the server 115).

Figure 5:
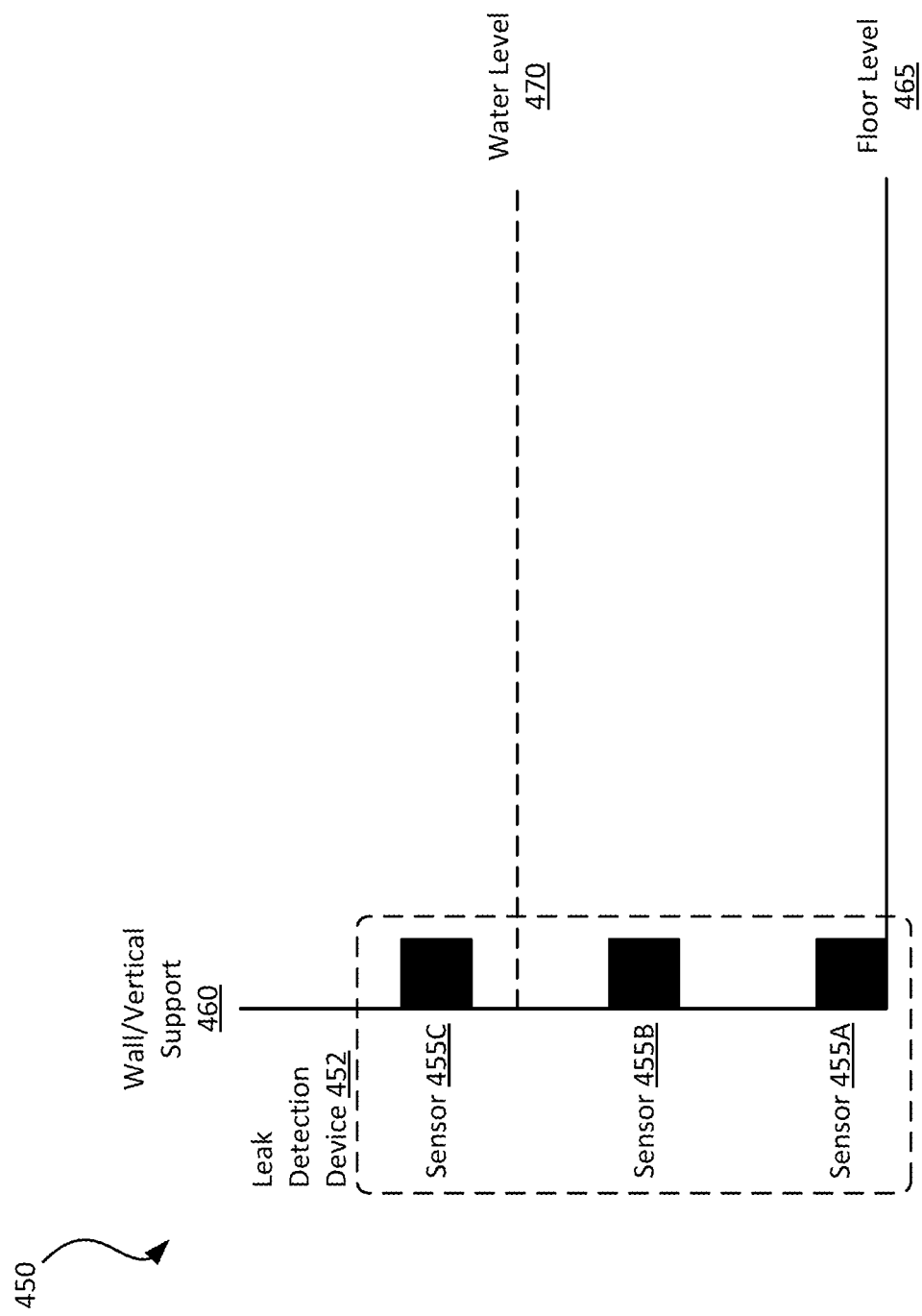
FIG. 5 depicts a non-limiting exemplary embodiment of a floor-sensing scheme.

FIG. 5 depicts an exemplary embodiment of a floor-sensing scheme 450. The example scheme 450 may be employed to sense a leak in a facility (e.g., a restroom). As depicted, the scheme 450 includes a leak detection device 452 including water level sensors 455A, 455B, 455C (hereinafter referred to as "sensors") mounted to a wall/vertical support 460 (hereinafter referred to as "wall"). The sensors 455A, 455B, 455C are located distances from a floor level 465. The sensors 455A, 455B, 455C may be configured at predetermined heights from the floor level 465 to sense a height of a water level 470. In some embodiments, the sensors 455A, 455B, 455C may sense the presence of a liquid other than water. In some embodiments, the sensors 455A, 455B, 455C may be evenly spaced from one another. For example, the first sensor 455A may be located 1 centimeter (cm) from the floor level 465, the second sensor 455B may be located 2 cm from the floor level 465, and the third sensor 455C may be located 3 cm from the floor level 465. However, different height arrangements of the sensors 455A, 455B, 455C may be contemplated.

As discussed with respect to FIG. 1, the sensors 455A, 455B, 455C may be included in a fixture 107 (e.g., the leak detection device 452) that is associated with an endpoint 105. Alternatively, in some embodiments, each sensor 455A, 455B, 455C is associated with its own leak detection device 452 and a single endpoint 105 and/or individual endpoints 105. In some embodiments, the water level, as sensed by at least one of the sensors 455A, 455B, 455C, corresponds to a severity of the leak. For example, when the water level 470 reaches a first predetermined level that exceeds the first sensor 455A, but does not reach the second sensor 455B, first sensor 455A sends a first signal (e.g., a "LEAK DETECTED" signal) to the leak detection device 452 and the leak detection device 452 may transmit a command signal (e.g., a "SHUT-OFF" command) to a second fixture 107 (e.g., a water inlet device) based on the water level reaching the first predetermined level.

Figure 6:
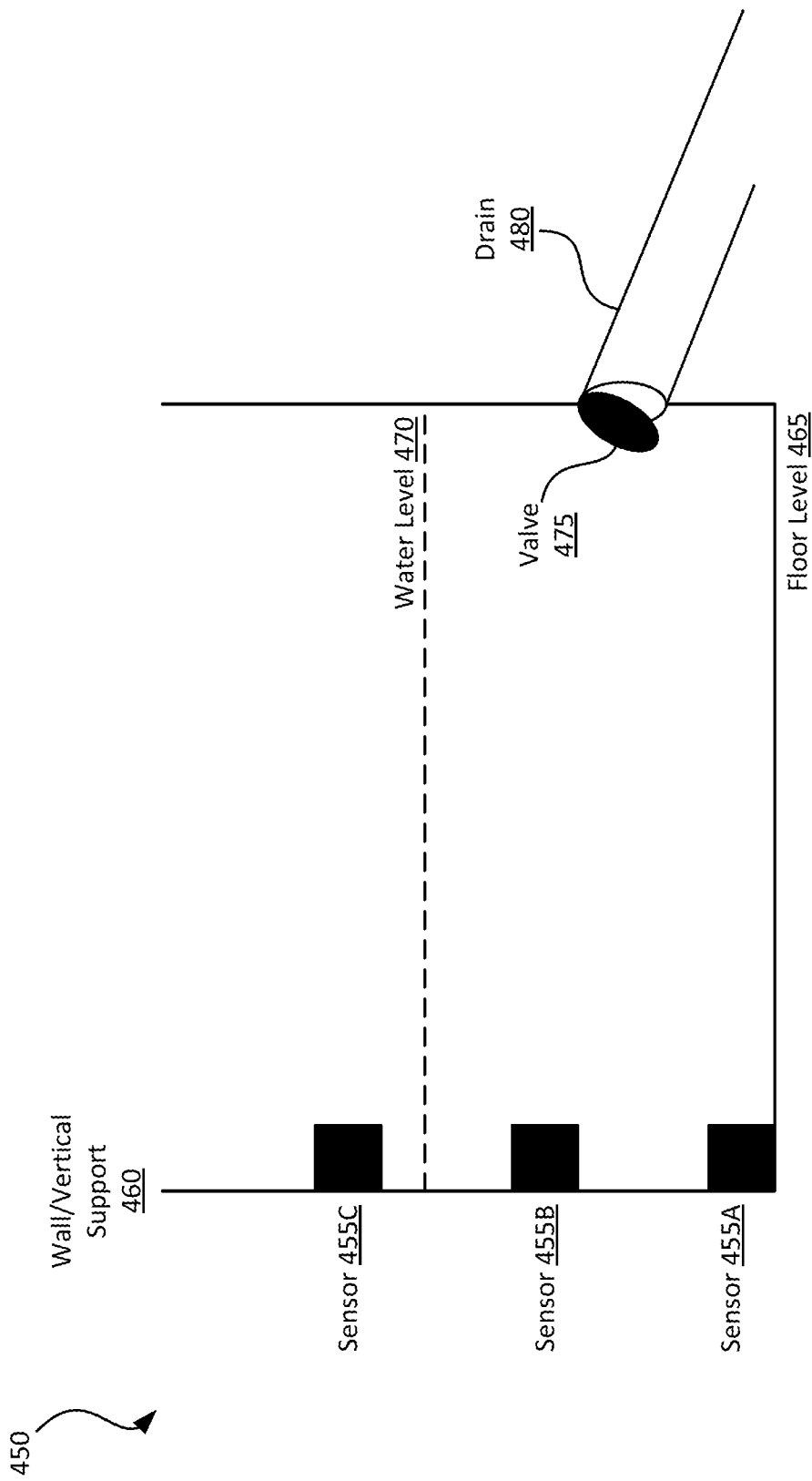
FIG. 6 depicts a non-limiting exemplary embodiment of a floor sensing scheme including a drain.

As another example, when the water level exceeds the second sensor 455B, but does not reach the third sensor 455C, the water level 470 reaches a second predetermined level (as illustrated in FIG. 5). When the water level 470 reaches the second predetermined level, one of the first sensor 455A and the second sensor 455B sends a second signal (e.g., a "SEVERE LEAK DETECTED" signal) to the leak detection device 452. The leak detection device 452 may then provide a fourth signal (e.g., an "OPEN" signal) to a third fixture 107 (e.g., a floor drain, such as floor drain 480). With reference to FIG. 6, in response to the water level reaching the second predetermined height, a valve 475 of the drain 480 opens to allow water to flow down the drain. In some embodiments, as illustrated in FIG. 6, the valve 475 and the drain 480 may be located on the wall 460. For example, the valve 475 may be located 1 cm from the floor level 465. Alternatively, or additionally, in some embodiments, the valve 475 and the drain 480 may be located on the floor level 465. In some embodiments, the valve 475 is a solenoid valve that is both electronically and manually controllable to open and close.

As another example, when the water level 470 exceeds the third sensor 455C, the water level 470 reaches at least a third predetermined level. The third sensor 455C may send a third signal (e.g., a "VERY SEVERE LEAK DETECTED" signal) to the leak detection device 452. The leak detection device 452 may transmit a number of signals and commands to various system 100 components in response to receiving the third signal.

Figure 7:
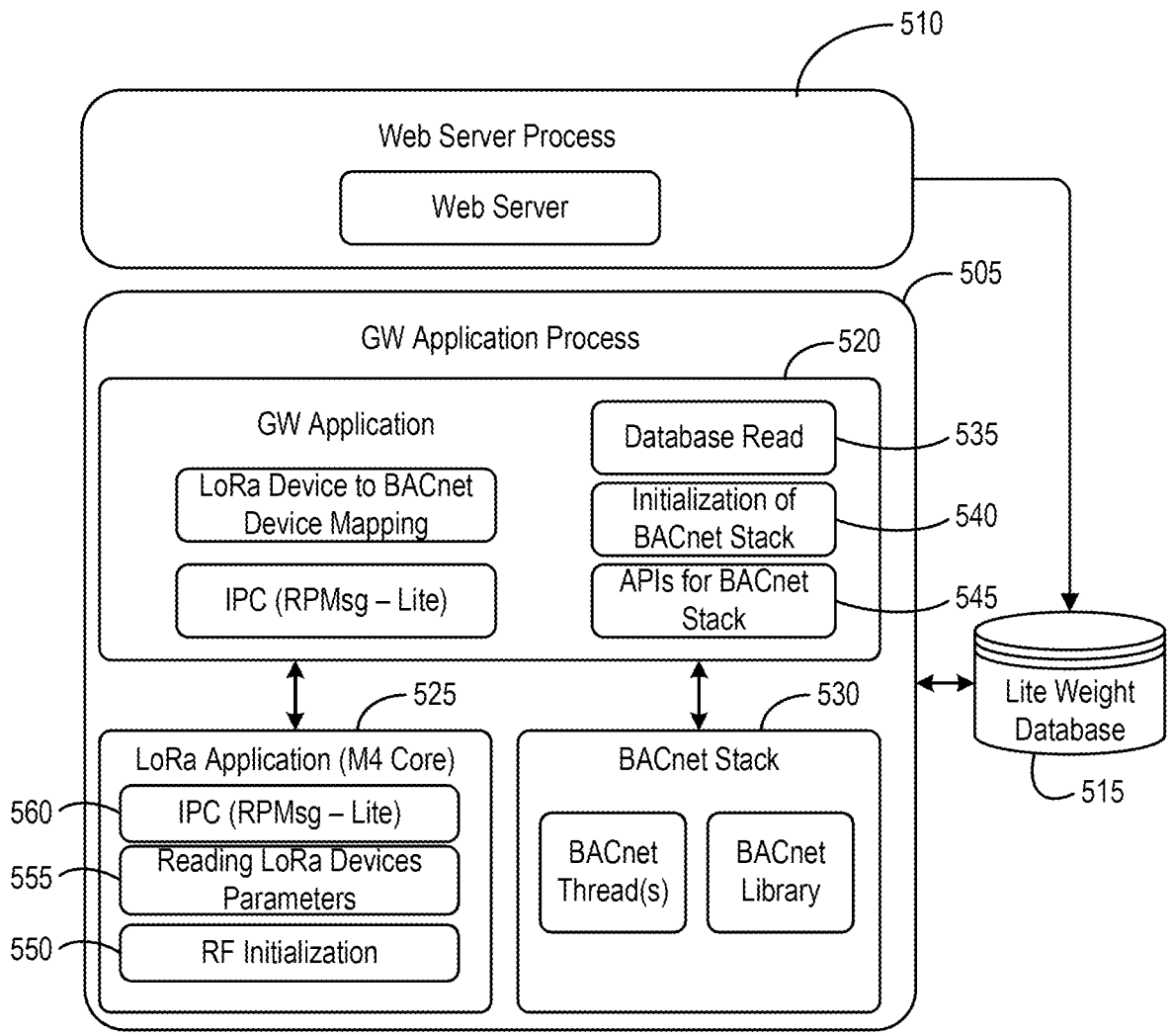
FIG. 7 depicts an architectural diagram of a non-limiting exemplary embodiment of a BACnet gateway device.

FIG. 7 depicts an exemplary embodiment of an architecture for the BACnet gateway device 122. As depicted in FIG. 7, the BACnet gateway device 122 executes or performs a gateway application process (represented by reference numeral 505), a web server application process (represented by reference numeral 510), or a combination thereof, which both access a database 515 (e.g., a lite weight database). In some embodiments, a user interface is provided to a user (e.g., via the user device 120). In some embodiments, the user interface interfaces are employed to set, for example, network parameters, BACnet stack configuration, LoRa to BACnet parameter mapping, and the like. As depicted in FIG. 7, in some embodiments, the gateway application process 505 is divided into three parts: a gateway application 520, a BACnet stack 525, and a LoRa Application 530. In some embodiments, the gateway application 520 reads configuration settings from the database 515 (represented by reference numeral 535), initializes the BACnet stack 530 (represented by reference numeral 540), registers application programming interfaces (APIs) for a LoRa call-back handler (represented by reference numeral 545), updates the BACnet stack 530 with a LoRa device, and the like. In some embodiments, the LoRa application 525 initializes an RF module (represented by reference numeral 550); reads parameters value received from a LoRa gateway, such as the facility device 110 (represented by reference numeral 555); initialize remote processor messaging (RPMsg) communication (represented by reference numeral 560), send LoRa device parameters to the BACnet stack 530, and the like. In some embodiments, the BACnet stack 530 provides the software API(s) to update device parameter values, BACnet services over ethernet, and the like.

Figure 8:
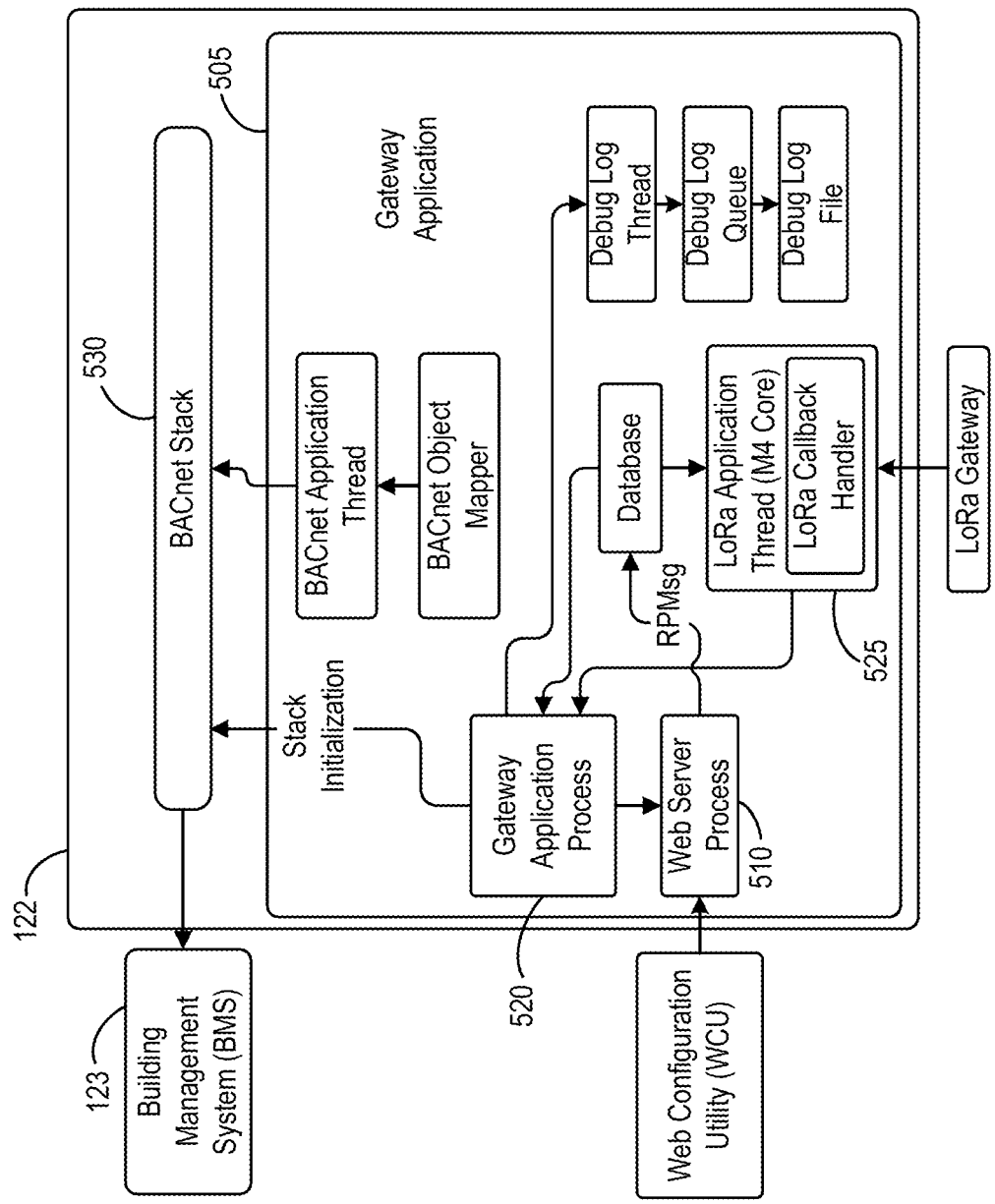
FIG. 8 depicts a flowchart of a non-limiting exemplary embodiment of a gateway application performed by a BACnet gateway device.
Figure 9:
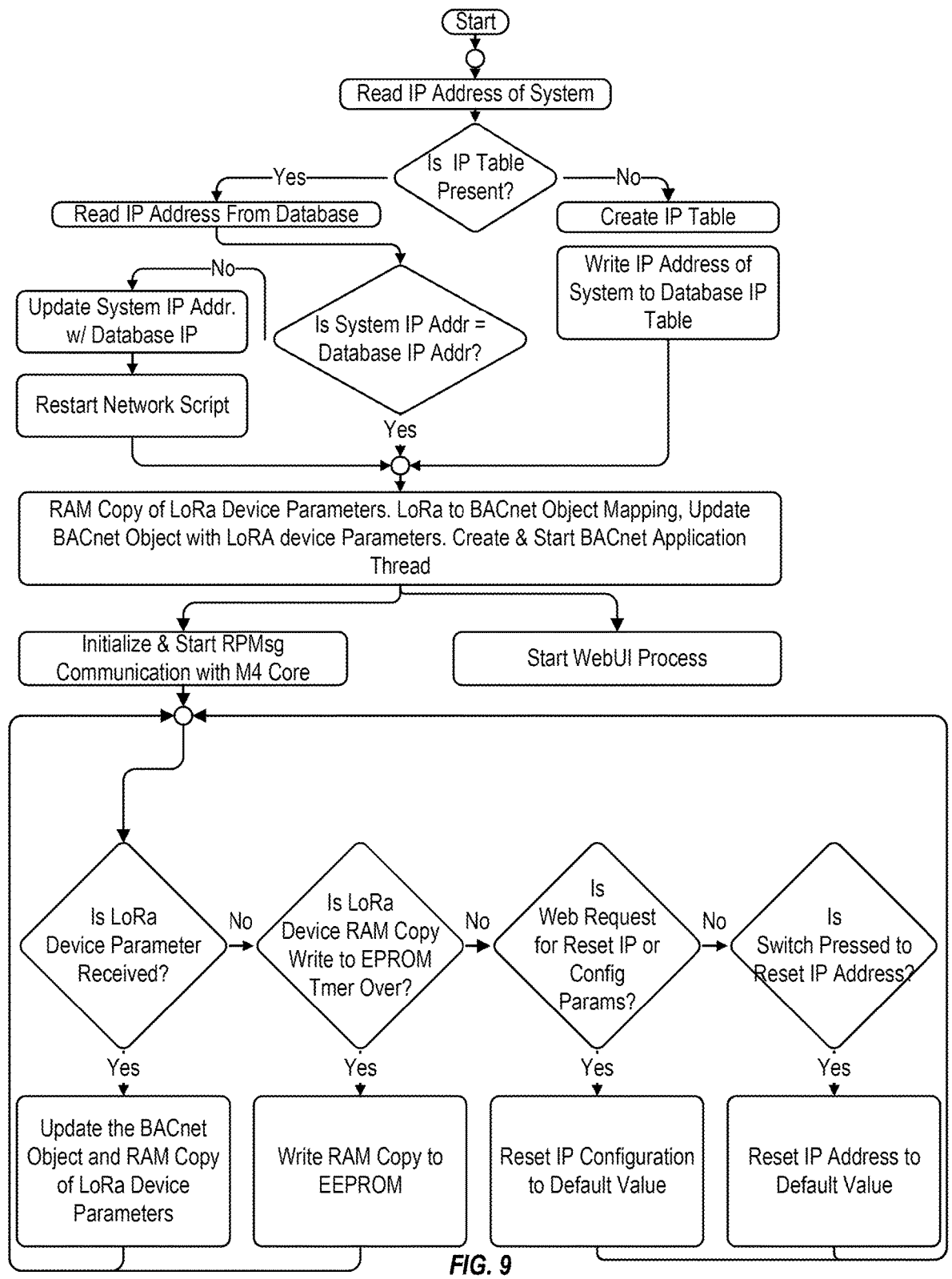
FIG. 9 depicts a flowchart of a non-limiting exemplary embodiment of example functionality performed by a gateway application.

FIG. 8 depicts an exemplary embodiment of an architecture for the gateway application executed by the BACnet gateway device 122. FIG. 9 depicts a flowchart illustrating example functionality performed by the gateway application. In the example illustrated in FIG. 8, the BACnet gateway application includes a gateway application process, a web server process, a BACnet application thread, a LoRa application, and a debug log thread. In some embodiments, the gateway application process is the main process executed by the BACnet gateway device 122 upon power ON. In some embodiments, the gateway application process performs an internet protocol (IP) acquisition function, BACnet stack initialization function (as per the database and EEPROM settings), a create thread function (for handling RPMSg communication, electrically erasable programmable read-only memory (EEPROM) read write operation, hardware switch functionality and RTC functionality), a process function (for the interprocess communication (IPC) commands for JavaScript Object Notation (JSON) file, update parameters, delete device, or the like), RPMSg communication with M4 core, EEPROM read and write operations (to store LoRa device parameters present value), reset network settings to default when hardware switch is pressed (including, for example, run time adoption of network and DACdel stack settings, syncing RTC and system time with Network Time Protocol (NTP), and the like). In some embodiments, the web server process performs Hypertext Transfer Protocol (HTTP) client communication, writing parameters into the database, and the like. In some embodiments, BACnet application thread parses the data received over RPMsg channel from M4 and set into the BACdel stack and the database. In some embodiments, LoRa application runs on cortex—M4 core. In some embodiments, the LoRa application handles LoRa RF communication and IPC using RPMsg framework, send received data to A7, and the like. In some embodiments, the debug log thread receives errors from other modules and creates a debug log file (e.g., when the debug log file creation option is enabled). In some embodiments, the debug log thread generates logs upon errors as well as debug/information logs based on the log level set.

Figure 10:
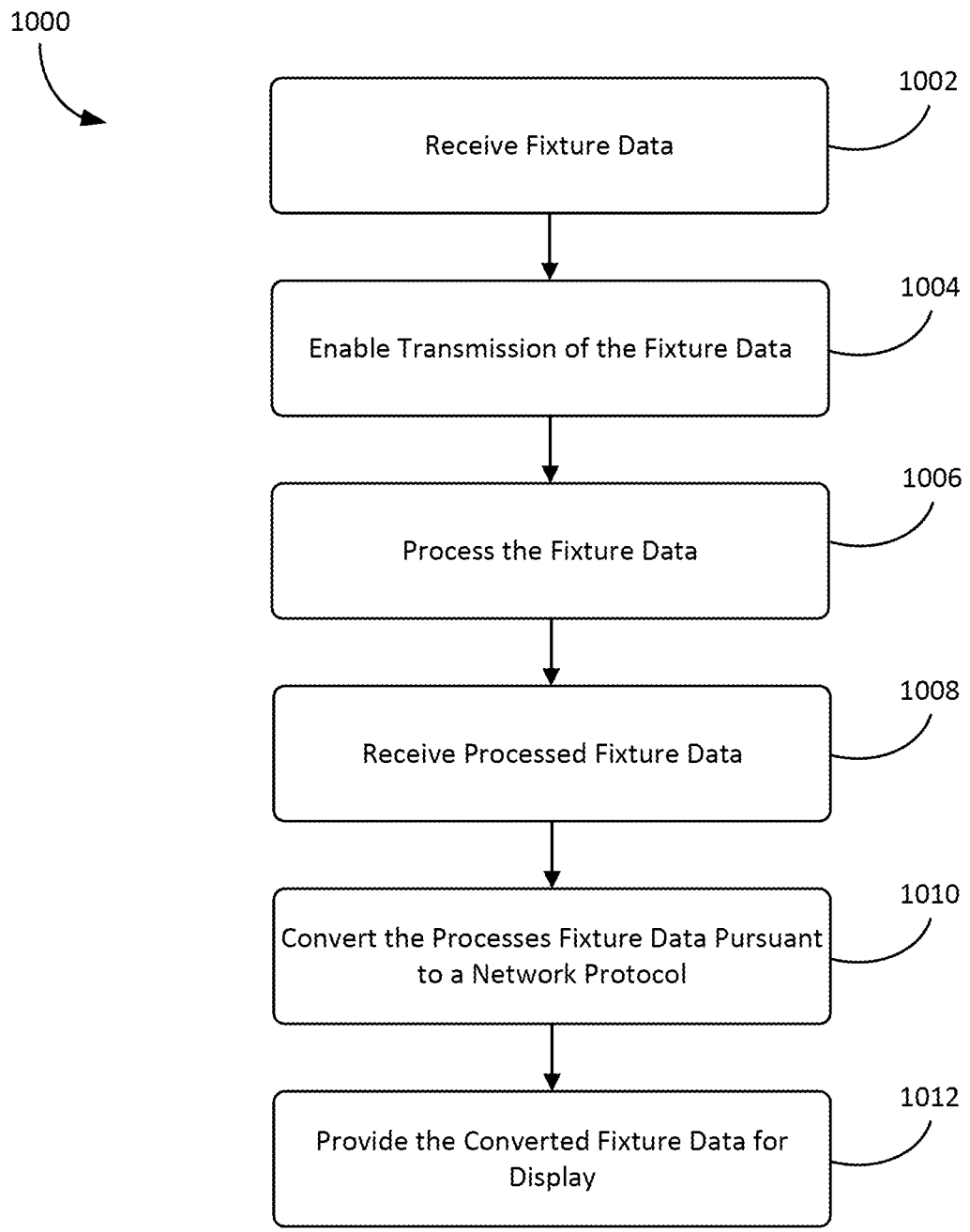
FIG. 10 depicts a flowchart of a non-limiting example process that can be implemented by embodiments of the present disclosure.

FIGS. 10 and 11A-F depicts a flowchart of a non-limiting, exemplary that can be implementation by embodiments of the present disclosure. The flowchart depicted in FIG. 10 illustrates a process 1000 for monitoring and managing a facility. The flowchart depicted in FIGS. 11A-11F illustrates a process 1100, including sub-processes 1110, 1120, 1030, 1040, and 1050, for detecting a leak in a facility, remedying the leak, and notifying users of the leak and corresponding data.

Figure 12:
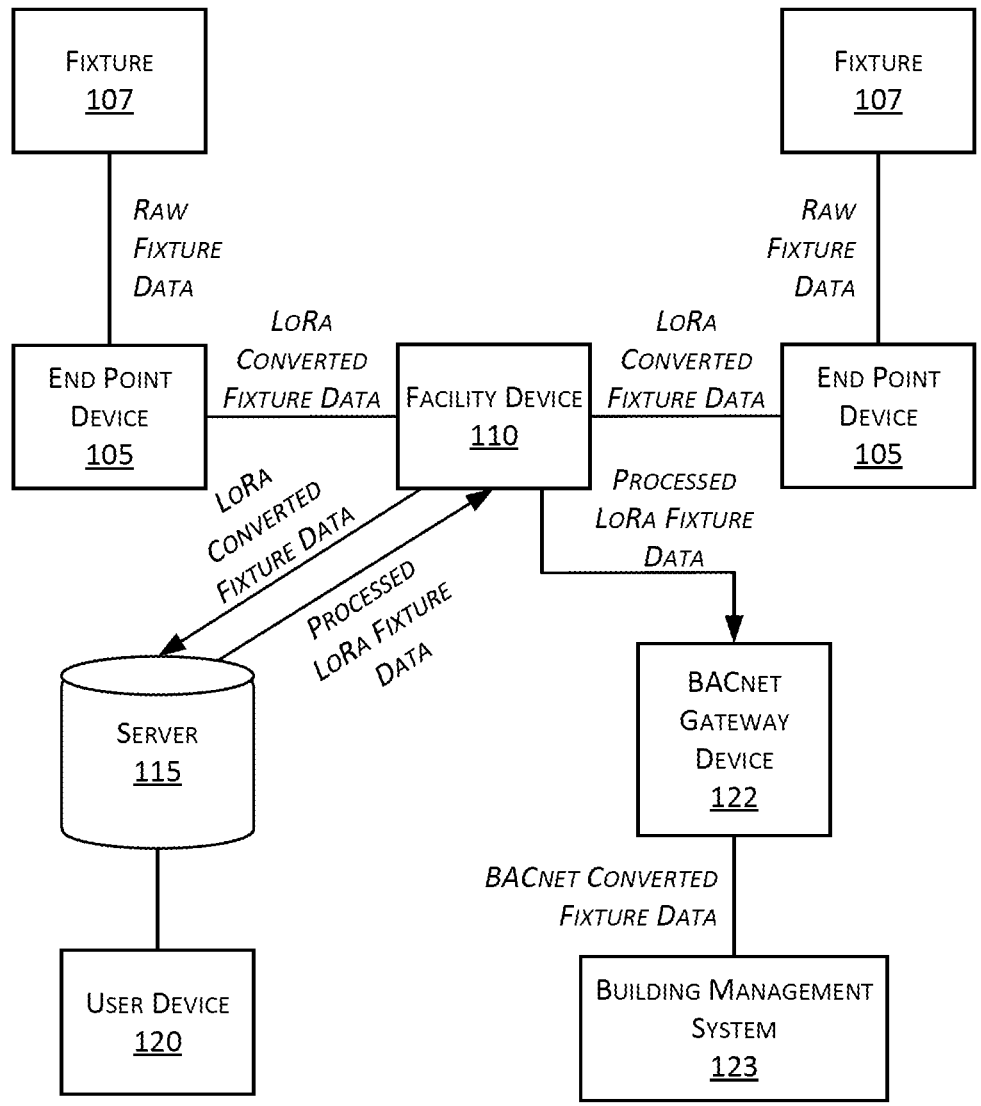
FIG. 12 depicts a non-limiting exemplary example of the communication between components of the system depicted in FIG. 1.

For clarity of presentation, the description that follows generally describes the processes 1000 and 1100 in the context of FIGS. 1-9 and 12. For example, the process 1000 is described with reference to FIG. 12. FIG. 12 depicts an exemplary embodiment of communication between the components of the system 100. However, it will be understood that the process the processes 1000 and 1100 may be performed, for example, by any other suitable system or a combination of systems as appropriate.

Referencing FIG. 10, at 1002, fixture data is received from at least one EM element 125 (e.g., the water level sensor 455A) of the fixture 107 (e.g., the leak detection device 452) associated with the facility. As noted above, in some embodiments, the EM elements 125 of the fixture 107 are configured to monitor or influence the operation of the fixture 107. Accordingly, in some embodiments, the fixture data for a particular fixture 107 is collected by the EM element(s) 125 where it is associated with that particular fixture 107. In some embodiments, the fixture data collected by the EM elements 125 of the fixture 107 is transmitted to the endpoint device 105 via a communication link between the fixture 107 and the endpoint device 105. In some embodiments, the fixture data is converted pursuant to a specific networking protocol consistent with a network connection between one or more components of the system 100. For example, in some embodiments, the endpoint device 105, the facility device 110, and the server 115 communicate via LoRa networking or communication protocols. Accordingly, in some embodiments, the electronic processor 200 of the endpoint device 105 converts the fixture data pursuant to LoRa networking protocols for transmission over a LoRa connection between the endpoint device 105 and the facility device 110. With reference to FIG. 12, in some embodiments, the fixture(s) 107 transmit "raw" fixture data to the endpoint device(s) 105. In response to receiving the raw fixture data, the endpoint device(s) 105 convert the "raw" fixture data pursuant to a specific networking protocol (in this example, a LoRa protocol). From 1002, the process 1000 proceeds to 1004.

At 1004, the fixture data is transmitted to a remote device for processing. For example, in some embodiments, the electronic processor 200 of the endpoint device 105 transmits the LoRa converted fixture data for processing over a network associated with the networking protocol. As described above, in some embodiments, the electronic processor 200 transmits the LoRa converted fixture data to the facility device 110 (as a gateway device). As illustrated in FIG. 12, in some embodiments, the endpoint device(s) 105 transmit the LoRa converted fixture data to the facility device 110. In some embodiments, the endpoint device 105 (e.g., the electronic processor 200) maintains a backlog of data packets (e.g., the LoRa converted data) until a connection to, for example, the facility device 110 is available (e.g., when a connection to the facility device 110 is temporarily unavailable). In some embodiments, the facility device 110 forwards the LoRa converted fixture data to a remote device, server, or database, for processing in the cloud, such as, for example, the server 115, the user device 120, or a combination thereof (as depicted in FIG. 12). In some embodiments, the server 115 (via an electronic processor of the server 115) receives fixture data (e.g., the LoRa converted fixture data) from the facility device 110. From 1004, the process 1000 proceeds to 1006.

At 1006, the received fixture data is processed to determine, for example, insights, usage patterns, alerts, and other data associated with the one or more facilities, including the fixtures 107 thereof. As an example, in some embodiments, a user employs the user device 120 (or another remote device) to access and interact with the fixture data. In some embodiments, the server 115 processes the received data to monitor a battery or power level (e.g., as a battery condition or characteristic) associated with the endpoint device 105. In some embodiments, the user views and interact with the determined usage patterns, which allow a facility entity or maintainer insights into, for example, how to optimize cleaning and maintenance schedules (e.g., for preventative or predicted maintenance), whether there is a need for additional facilities, endpoint devices, or a combination thereof, and the like. As noted above, in some embodiments, the server 115 is configured to monitor and manage one or more facilities, including the fixtures 107 therein. From 1006, the process 1000 proceeds to 1008.

At 1008, the processed fixture data is received by the facility device 110 (for example, the first gateway device) from server 115. As seen in FIG. 12, in some embodiments, after processing the LoRa converted fixture data, the server 115 may transmit the processed LoRa fixture data to the facility device 110. In some embodiments, in response to receiving the processed LoRa fixture data, the facility device 110 provides the processed LoRa fixture data to the BACnet gateway device 122. In some embodiments, the server 115 may transmit the processed LoRa fixture data directly to the BACnet gateway device 122 (not shown). From 1008, the process 1000 proceeds to 1010.

At 1010, in response to receiving the processed LoRa fixture data, the BACnet gateway device 122 converts the processed LoRa fixture data pursuant to a networking protocol associated with a building management solution or system (e.g., the BMS 123). As noted above, in some embodiments, the BMS 123, including the sub-systems included therein, communicates via BACnet communication protocol(s). As noted above, in some embodiments, the BMS 123 is associated with one or more particular vendors. As an example, in some embodiments, the BMS 123 includes a ventilation system associated with "Vendor A" and a security system associated with "Vendor B." In some embodiments, data associated with the BMS 123 is accessible to a user via a vendor specific dashboard (e.g., a BMS or visual dashboard), such as a browser application or dedicated software application designed by a particular vendor. Accordingly, in some embodiments, the BACnet gateway device 122 converts, via the BACnet electronic processor 400, the processed fixture data from a LoRa protocol to a BACnet protocol. From 1010, the process 1000 proceeds to 1012.

At 1012, after converting the processed LoRa fixture data, the BACnet gateway device 122 transmits the converted fixture data for display via a BMS or visual dashboard associated with the BMS 123. As noted above, in some embodiments, the converted fixture data includes one or more alerts, such as a water alert, a waste alert, a fire alert, an indoor air pollutant alert, a temperature alert, a contamination alert, and the like. Accordingly, in some embodiments, the BACnet gateway device 122 transmits the one or more alerts for display via the BMS or visual dashboard associated with the BMS 123. For example, as depicted in FIG. 12, in some embodiments, the BACnet gateway device 122 may transmit the converted fixture data (as BACnet converted fixture data) to the BMS 123 (or one or more components therein). From 1012, the process 1000 ends.

Figure 11A:
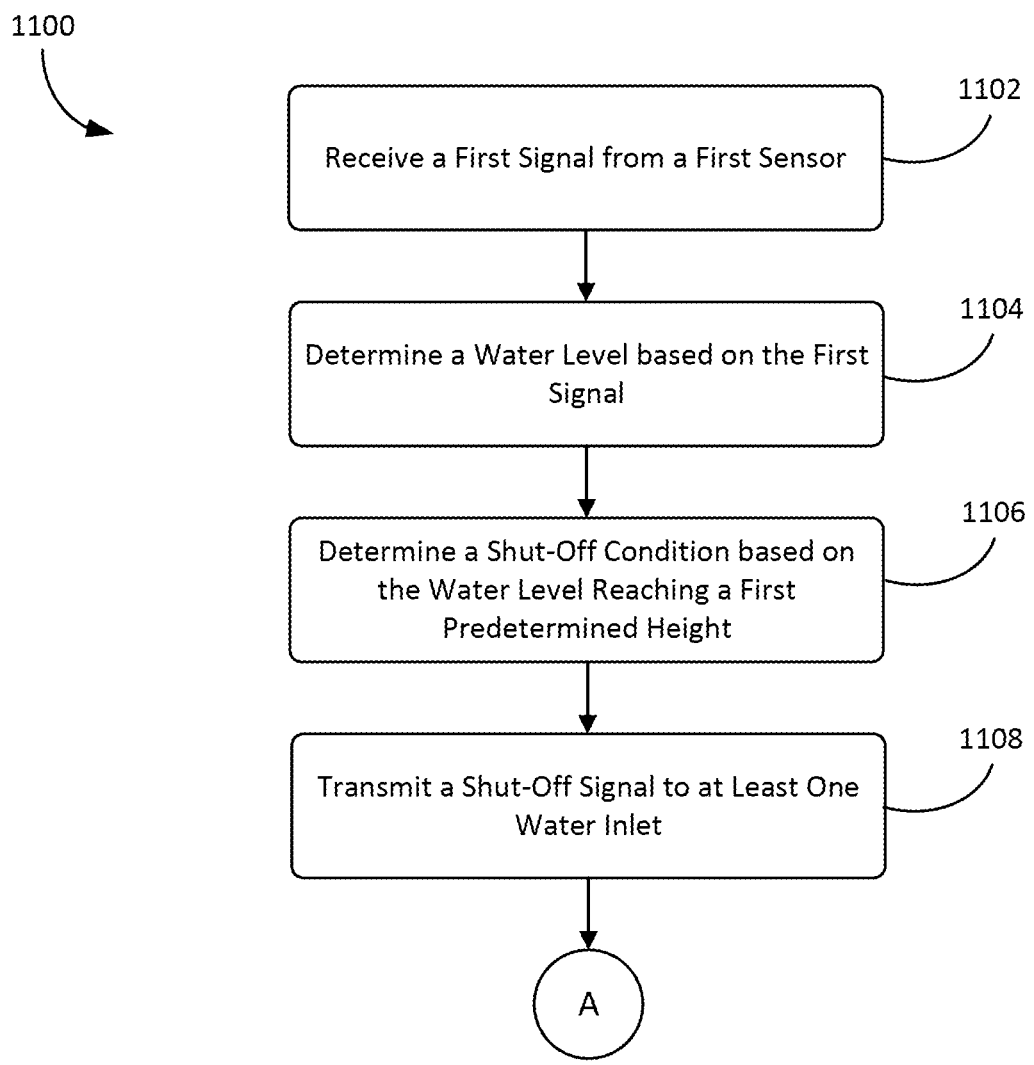
FIGS. 11A-11F depict flowcharts of a non-limiting example process and sub-processes that can be implemented by embodiments of the present disclosure.

Referencing FIG. 11A, at 1102, a fixture 107 (e.g., leak detection device 452) receives a first signal from a first sensor (e.g., first water level sensor 455A). For example, the first water level sensor 455A may detect a water level 470 that meets or exceeds the height at which the first water level sensor 455A is disposed on a wall 460. The first signal may be a "LEAK DETECTED" signal. From 1102, the process 1100 proceeds to 1004.

At 1104, the leak detection device 452 determines a water level 470 based on the first signal. For example, the leak detection device 452 may determine that the water level 470 has reached at least a first predetermined height. Alternatively, or additionally, in some embodiments, one of a facility device 110 and/or a server 115 may determine the water level 470 based on the first signal. For example, in some embodiments, the endpoint device 105, the facility device 110, and the server 115 communicate via LoRa networking or communication protocols. In some embodiments, the facility device 110 forwards the first signal to the server 115 for processing in the cloud. Based on the first signal, one of the facility devices 110 and the server 115 may determine that the water level 470 has reached at least the first predetermined height. The determination may then be transmitted to the leak detection device 452, via the endpoint device 105. From 1104, the process 1100 proceeds to 1006.

At 1106, the leak detection device 452 determines a shut-off condition based on the water level 470 reaching the first predetermined height. In some embodiments, the leak detection device 452 determines that a water inlet needs to be shut-off to stop the water level 470 from rising. Similar to 1004, in some embodiments, one of the facility device 110 and/or the server 115 may determine a shut-off condition based on the water level 470 reaching the first predetermined height. From 1106, the process 1100 proceeds to 1008.

At 1108, the leak detection device 452 transmits a shut-off signal (e.g., "SHUT-OFF") to at least one water inlet (e.g., second fixture 107). In some embodiments, the at least one water inlet includes an actuator (e.g., a solenoid valve) that allows for the flow of water. The actuator is configured to close upon receipt of the shut-off signal, ceasing the flow of water.

From 1108, the process 1100 proceeds to one or more of the sub-processes 1110, 1120, 1130, 1140, and 1150 depicted in FIGS. 11B-11F respectively. Sub-process 1110 is a sub-process of process 1100 for providing an alert to a remote device based on a shut-off of the at least one water inlet not occurring. Sub-process 1120 is a sub-process of process 1100 for providing an open command to a drain. Sub-process 1130 is a sub-process of process 1100 for providing an alert to a remote device based on a determined variation in at least one of the temperature and the pressure of the water at the water inlet. Sub-process 1140 is a sub-process of process 1100 for determining that the roof drain caused the flooding. Sub-process 1150 is a sub-process of process 1100 for providing a marker to a user interface of a remote device. In some embodiments, the process 1100 may continue to various process blocks sequentially or in parallel.

Figure 11B:
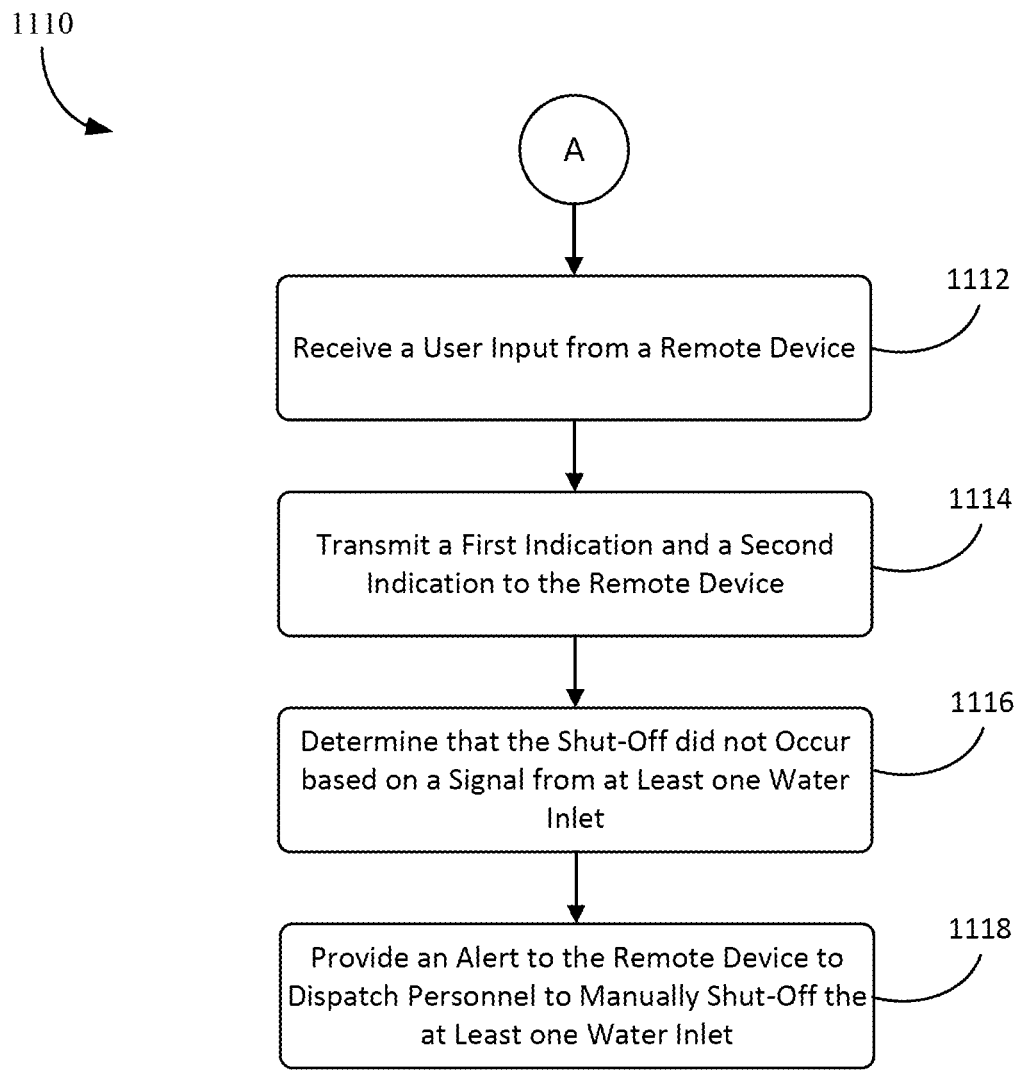

At 1112 (sub-process 1010; FIG. 11B), the leak detection device 452 receives a user input from a remote device. For example, the leak detection device 452 may receive the user input from at least one of the user device 120 via the communication network 140, and the facility device 110. In some embodiments, the user input triggers a shut off of the at least one water inlet. For example, the user may interact with a user interface of the user device 120 to trigger a shut off of the at least one water inlet. In some embodiments, the leak detection device 452 may receive the user input triggering a shut off of the at least one water inlet prior to transmitting the shut-off signal to the at least one water inlet (i.e., prior to 1108). From 1112, the process 1100 proceeds to 1114.

At 1114, the leak detection device 452 transmits a first indication and a second indication to the remote device. For example, the leak detection device 452 may transmit the first indication and the second indication to at least one of the user device 120 and the facility device 110. The first indication may indicate a water level in the facility as determined by the leak detection device 452. The second indication may indicate that the shut-off signal was transmitted to the at least one water inlet. In some embodiments, the first indication and the second indication are sent prior to the leak detection device 452 receiving a user input from the remote device (i.e., prior to 1110). From 1114, the process 1100 proceeds to 1116.

At 1116, the leak detection device 452 determines that the shut-off did not occur based on a signal from the at least one water inlet. The at least one water inlet may sense that the solenoid valve is still in an OPEN position and may then transmit an "ON" signal to the leak detection device 452. In some embodiments, the solenoid valve may have remained in the OPEN position due to a blockage and/or a mechanical malfunction. From 1114, the process 1100 proceeds to 1116.

At 1118, the leak detection device 452 provides an alert to the remote device to dispatch personnel to manually shut-off the at least one water inlet. For example, the leak detection device 452 may provide the alert to at least one of the user device 120 and the facility device 110. In some embodiments, a building manager may be alerted to shut-off the at least one water inlet. In some embodiments, manually shutting off the at least one water inlet includes rotating a valve, pulling a lever, and/or pressing a switch to move the solenoid valve to a CLOSED position. From 1118, the process 1100 ends or proceeds to another sub-process.

Figure 11C:
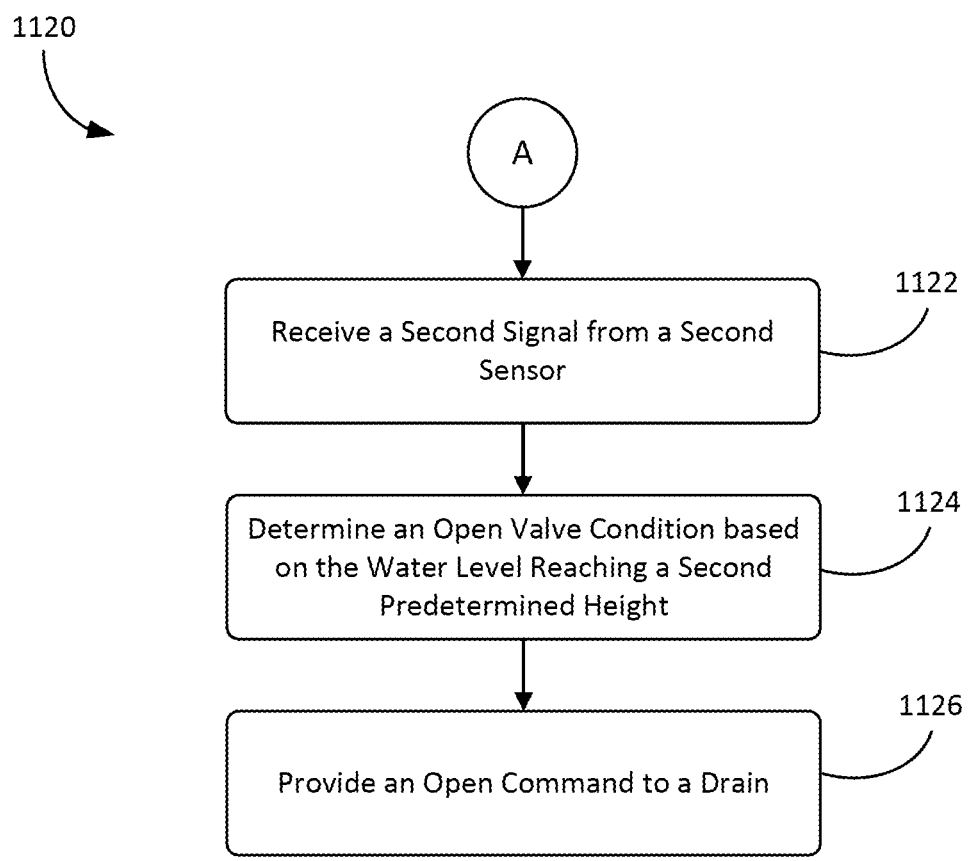

At 1122 (sub-process 1020; FIG. 11C), the leak detection device 452 receives a second signal from a second sensor (e.g., second water level sensor 455B). For example, the second water level sensor 455B may detect a water level 470 that meets or exceeds the height at which the second water level sensor 455B is disposed on the wall 460. The second signal may be a "SEVERE LEAK DETECTED" signal. From 1122, the process 1100 proceeds to 1124.

At 1124, the leak detection device 452 determines an open valve condition based on the water level 470 reaching at least a second predetermined height. Alternatively, or additionally, in some embodiments, one of a facility device 110 and/or a server 115 may determine the water level 470 based on the second signal. For example, in some embodiments, the endpoint device 105, the facility device 110, and the server 115 communicate via LoRa networking or communication protocols. In some embodiments, the facility device 110 forwards the second signal to the server 115 for processing in the cloud. Based on the first signal, one of the facility device 110 and the server 115 may determine that the water level 470 has reached at least the second predetermined height. The determination may then be transmitted to the leak detection device 452, via the endpoint device 105. From 1124, the process 1100 proceeds to 1126.

At 1126, the leak detection device 452 provides an open command (e.g., "OPEN") to a drain (e.g., floor drain 480 (e.g., a third fixture 107)). In some embodiments, the floor drain 480 includes a valve 475 that allows water to flow down the floor drain 480 when opened. For example, upon receipt of the "OPEN" command, the floor drain 480 opens the valve 475 to allow the water to flow down the floor drain 480. In some embodiments, the valve 475 includes a small motor that rotates a blockage component (e.g., a metal door) to an OPEN position. In some embodiments, the valve 475 automatically closes when the first water level sensor 455A no longer senses the presence of water. From 1126, the process 1100 ends or proceeds to another sub-process.

Figure 11D:
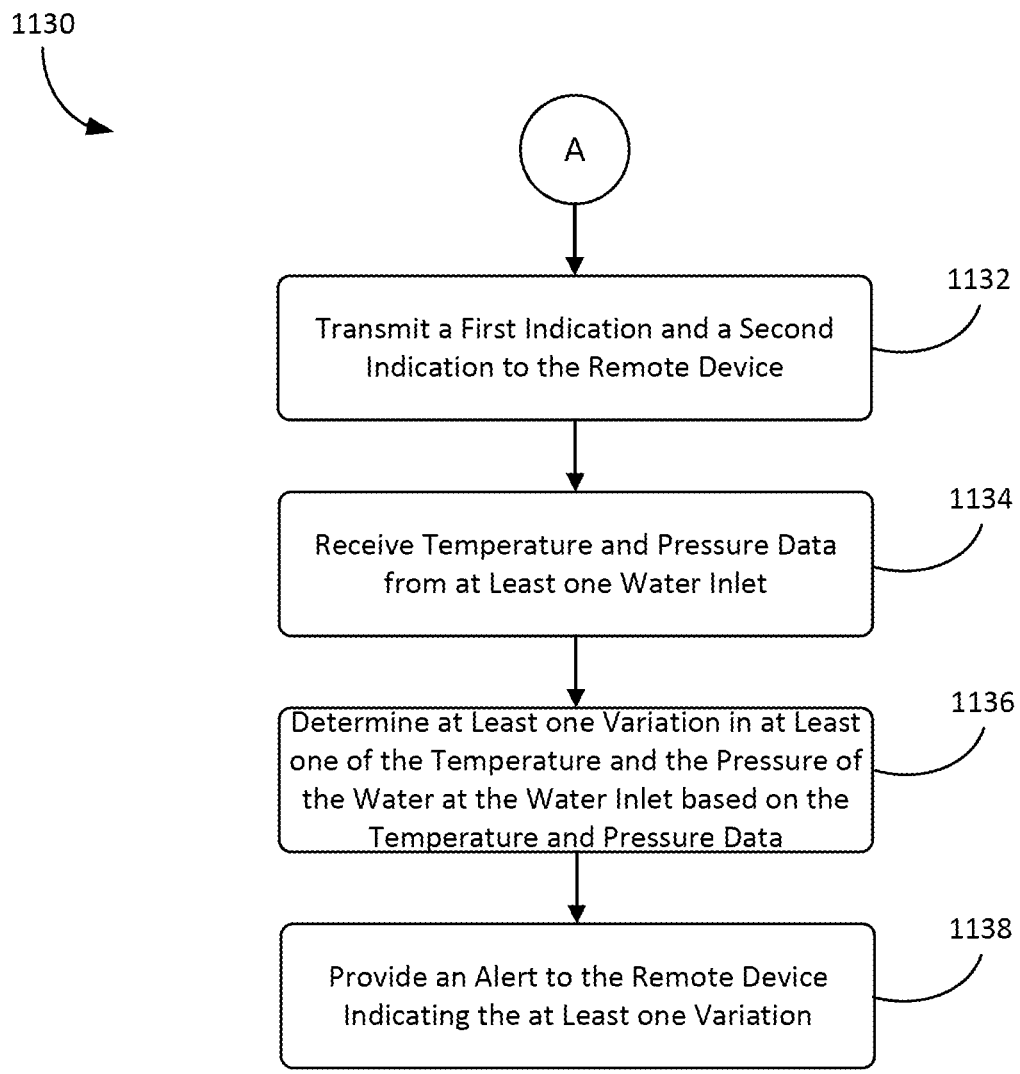

At 1132 (sub-process 1130; FIG. 11D), the leak detection device 452 transmits a first indication and a second indication to the remote device. For example, the leak detection device 452 may transmit the first indication and the second indication to at least one of the user device 120 and the facility device 110. The first indication may indicate a water level in the facility as determined by the leak detection device 452. The second indication may indicate that the shut-off signal was transmitted to the at least one water inlet. From 1132, the process 1100 proceeds to 1134.

At 1134, the leak detection device 452 receives temperature and pressure data from the at least one water inlet. For example, the at least one water inlet may include a temperature sensor and a pressure sensor that automatically and consistently records the temperature and pressure of the at least one water inlet. The at least one water inlet may be constantly transmitting the temperature data and the pressure data to at least one of the leak detection device 452, the server 115, and the facility device 110, via an endpoint 105. In some embodiments, at least one of the facility device 110 and the server 115 may analyse the data to determine data that corresponds to water flowing through the at least one water inlet, and then the at least one of the facility device 110 and the server 115 may transmit the data to leak detection device 452. From 1134, the process 1100 proceeds to 1136.

At 1136, the leak detection device 452 determines at least one variation in at least one of the temperature and the pressure of the water at the at least one water inlet based on received the temperature and pressure data. In some embodiments, the at least one of the facility device 110 and the server 115 may determine the at least one variation and then transmit the variation to the leak detection device. A variation in the temperature data, for example, may include a spike in temperature or a steep decline in temperature. A variation in the pressure data, for example, may include a sudden increase or decrease in water pressure. From 1136, the process 1100 proceeds to 1138.

At 1138, the leak detection device 452 provides an alert to the remote device indicating the at least one variation. For example, the leak detection device 452 may provide the alert to at least one of the user device 120 and the facility device 110. From 1138, the process 1100 ends or proceeds to another sub-process.

Figure 11E:
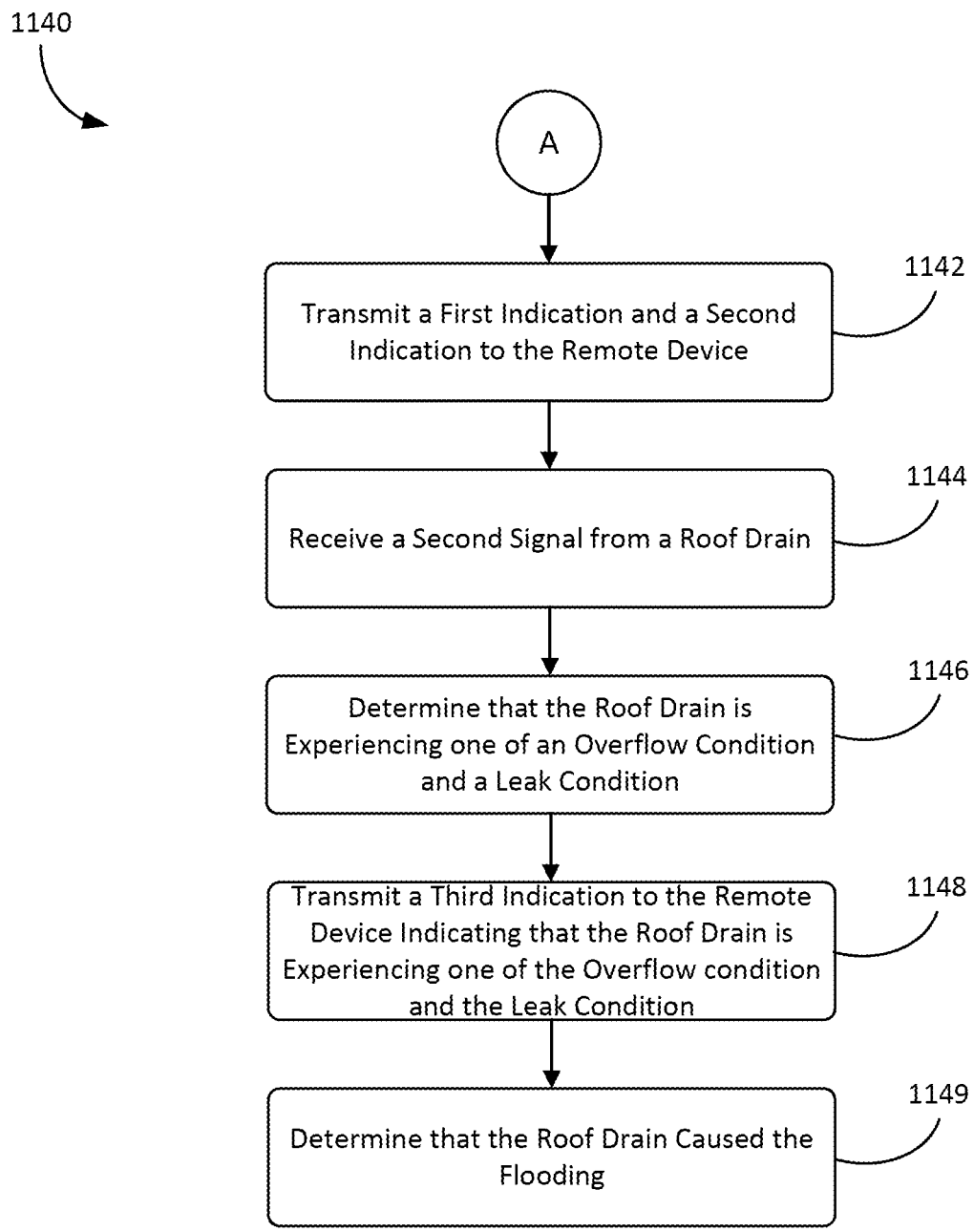

At 1142 (sub-process 1040; FIG. 11E), the leak detection device 452 transmits a first indication and a second indication to the remote device. For example, the leak detection device 452 may transmit the first indication and the second indication to at least one of the user device 120 and the facility device 110. The first indication may indicate a water level in the facility as determined by the leak detection device 452. The second indication may indicate that the shut-off signal was transmitted to the at least one water inlet. From 1142, the process 1100 proceeds to 1144.

At 1144, the leak detection device 452 may receive a second signal (e.g., "LEAK DETECTED") from a roof drain (e.g., a fourth fixture 107). In some embodiments, the roof drain includes a valve that may be moved between an OPEN and a CLOSED position. In some embodiments, the roof drain may be configured to provide ventilation from the facility to the outside, thus, when the valve is not in the CLOSED position, water may be able to enter the facility. The roof drain may include a sensor that senses the presence of water at the roof drain. From 1144, the process 1100 proceeds to 1146.

At 1146, the leak detection device 452 determines that the roof drain is experiencing one of an overflow condition and a leak condition. From 1146, the process 1100 proceeds to 1148.

At 1148, the leak detection device 452 transmits a third indication to the remote device indicating that the roof drain is experiencing one of the overflow condition and the leak condition. For example, the leak detection device 452 may transmit the third indication to at least one of the user device 120 and the facility device 110. The third indication may indicate that the roof drain is experiencing an overflow condition or a leak condition. From 1148, the process 1100 ends or proceeds to another sub-process. From 1148, the process 1100 proceeds to 1149.

At 1149, the leak detection device 452 determines that the roof drain caused the flooding. In some embodiments, the leak detection device 452 may transmit a "CLOSE" signal to the valve of the roof drain. Based on the water level 470 ceasing to rise once the valve is closed, the leak detection device determines that the roof drain was the cause of the flooding. From 1149, the process 1100 ends or proceeds to another sub-process.

Figure 11F:
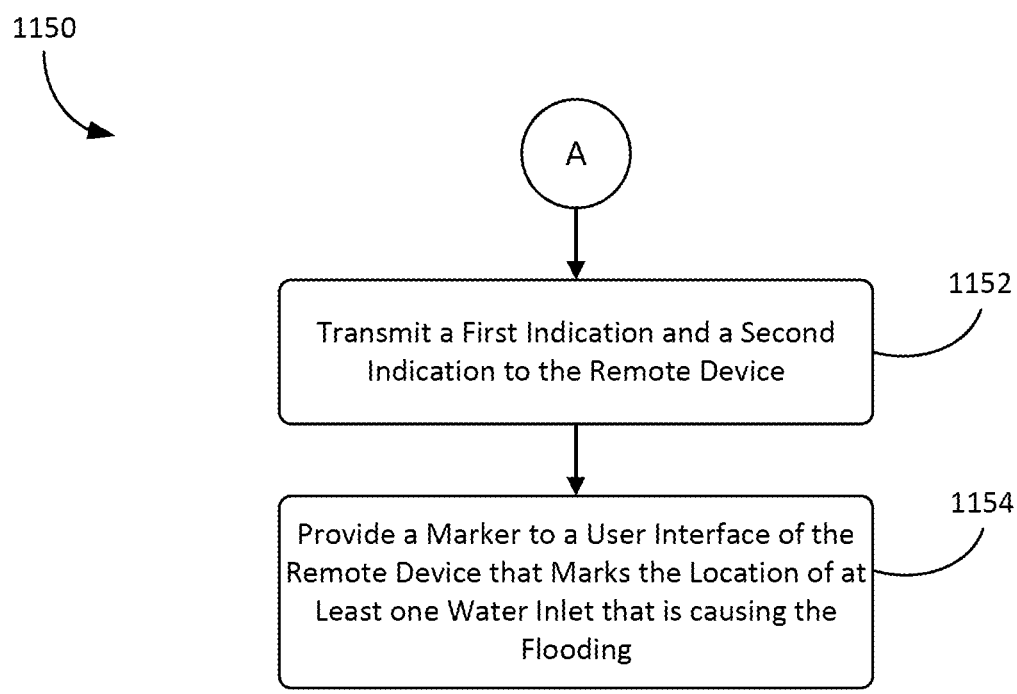

At 1152 (sub-process 1050; FIG. 11F), the leak detection device 452 transmits a first indication and a second indication to the remote device. For example, the leak detection device 452 may transmit the first indication and the second indication to at least one of the user device 120 and the facility device 110. The first indication may indicate a water level in the facility as determined by the leak detection device 452. The second indication may indicate that the shut-off signal was transmitted to the at least one water inlet. From 1152, the process 1100 proceeds to 1154.

At 1154, the leak detection device 452 provides a marker to a user interface of the remote device that marks the location of at least one water inlet that is causing the flooding. For example, the leak detection device 452 may provide the marker to the user interface of at least one of the user device 120 and the facility device 110. The marker may be placed on a map of the facility to pinpoint a location of the at least one water inlet. From 1154, the process 1100 ends or proceeds to another sub-process.

Non-transitory Computer Readable Storage Medium

In some embodiments, the platforms, systems, media, and methods disclosed herein include one or more non-transitory computer readable storage media encoded with a program including instructions executable by the operating system of an optionally networked computer. In further embodiments, a computer readable storage medium is a tangible component of a computer. In still further embodiments, a computer readable storage medium is optionally removable from a computer. In some embodiments, a computer readable storage medium includes, by way of non-limiting examples, CD-ROMs, DVDs, flash memory devices, solid state memory, magnetic disk drives, magnetic tape drives, optical disk drives, cloud computing systems and services, and the like. In some cases, the program and instructions are permanently, substantially permanently, semi-permanently, or non-transitorily encoded on the media.

Computer Program

In some embodiments, the platforms, systems, media, and methods disclosed herein include at least one computer program, or use of the same. A computer program includes a sequence of instructions, executable in the computer's CPU, written to perform a specified task. Computer readable instructions may be implemented as program modules, such as functions, objects, API, data structures, and the like, that perform particular tasks or implement particular abstract data types. In light of the disclosure provided herein, those of skill in the art will recognize that a computer program may be written in various versions of various languages.

The functionality of the computer readable instructions may be combined or distributed as desired in various environments. In some embodiments, a computer program comprises one sequence of instructions. In some embodiments, a computer program comprises a plurality of sequences of instructions. In some embodiments, a computer program is provided from one location. In other embodiments, a computer program is provided from a plurality of locations. In various embodiments, a computer program includes one or more software modules. In various embodiments, a computer program includes, in part or in whole, one or more web applications, one or more mobile applications, one or more standalone applications, one or more web browser plug-ins, extensions, add-ins, or add-ons, or combinations thereof.

Machine Learning

In some embodiments, machine learning algorithms are employed to build a model to determine quantifiable measures of dyadic ties between the individuals. In some embodiments, machine learning algorithms are employed to build a model to determine the filter relevant or chorological contact information for a user. Examples of machine learning algorithms may include a support vector machine (SVM), a naïve Bayes classification, a random forest, a neural network, deep learning, or other supervised learning algorithm or unsupervised learning algorithm for classification and regression. The machine learning algorithms may be trained using one or more training datasets. For example, previously received contextual data may be employed to train various algorithms. Moreover, as described above, these algorithms can be continuously trained/retrained using real-time user data as it is received. In some embodiments, the machine learning algorithm employs regression modelling where relationships between variables are determined and weighted. In some embodiments, the machine learning algorithm employ regression modelling, wherein relationships between predictor variables and dependent variables are determined and weighted.

Software Modules

In some embodiments, the platforms, systems, media, and methods disclosed herein include software, server, and/or database modules, or use of the same. In view of the disclosure provided herein, software modules are created by techniques known to those of skill in the art using machines, software, and languages known to the art. The software modules disclosed herein are implemented in a multitude of ways. In various embodiments, a software module comprises a file, a section of code, a programming object, a programming structure, or combinations thereof. In further various embodiments, a software module comprises a plurality of files, a plurality of sections of code, a plurality of programming objects, a plurality of programming structures, or combinations thereof. In various embodiments, the one or more software modules comprise, by way of non-limiting examples, a web application, a mobile application, and a standalone application. In some embodiments, software modules are in one computer program or application. In other embodiments, software modules are in more than one computer program or application. In some embodiments, software modules are hosted on one machine. In other embodiments, software modules are hosted on more than one machine. In further embodiments, software modules are hosted on cloud computing platforms. In some embodiments, software modules are hosted on one or more machines in one location. In other embodiments, software modules are hosted on one or more machines in more than one location.

Web Application

In some embodiments, a computer program includes a web application. In light of the disclosure provided herein, those of skill in the art will recognize that a web application, in various embodiments, utilizes one or more software frameworks and one or more database systems. In some embodiments, a web application is created upon a software framework such as Microsoft® .NET or Ruby on Rails (RoR). In some embodiments, a web application utilizes one or more database systems including, by way of non-limiting examples, relational, non-relational, object oriented, associative, and eXtensible Markup Language (XML) database systems. In further embodiments, suitable relational database systems include, by way of non-limiting examples, Microsoft® SQL Server, mySQL™, and Oracle®. Those of skill in the art will also recognize that a web application, in various embodiments, is written in one or more versions of one or more languages. A web application may be written in one or more markup languages, presentation definition languages, client-side scripting languages, server-side coding languages, database query languages, or combinations thereof. In some embodiments, a web application is written to some extent in a markup language such as Hypertext Markup Language (HTML), Extensible Hypertext Markup Language (XHTML), or XML. In some embodiments, a web application is written to some extent in a presentation definition language such as Cascading Style Sheets (CSS). In some embodiments, a web application is written to some extent in a client-side scripting language such as Asynchronous JavaScript and XML (AJAX), Flash® ActionScript, JavaScript, or Silverlight®. In some embodiments, a web application is written to some extent in a server-side coding language such as Active Server Pages (ASP), ColdFusion®, Perl, Java™, JavaServer Pages (JSP), Hypertext Preprocessor (PHP), Python™, Ruby, Tcl, Smalltalk, WebDNA®, or Groovy. In some embodiments, a web application is written to some extent in a database query language such as Structured Query Language (SQL). In some embodiments, a web application integrates enterprise server products such as IBM® Lotus Domino®. In some embodiments, a web application includes a media player element. In various further embodiments, a media player element utilizes one or more of many suitable multimedia technologies including, by way of non-limiting examples, Adobe® Flash®, HTML 5, Apple® QuickTime®, Microsoft® Silverlight®, Java™, and Unity®.

Mobile Application

In some embodiments, a computer program includes a mobile application provided to a mobile computer. In some embodiments, the mobile application is provided to a mobile computer at the time it is manufactured. In other embodiments, the mobile application is provided to a mobile computer via the computer network described herein.

In view of the disclosure provided herein, a mobile application is created by techniques known to those of skill in the art using hardware, languages, and development environments known to the art. Those of skill in the art will recognize that mobile applications are written in several languages. Suitable programming languages include, by way of non-limiting examples, C, C++, C #, Objective-C, Java™, JavaScript, Pascal, Object Pascal, Python™, Ruby, VB.NET, WML, and XHTML/HTML with or without CSS, or combinations thereof.

Suitable mobile application development environments are available from several sources. Commercially available development environments include, by way of non-limiting examples, AirplaySDK, alcheMo, Appcelerator, Celsius, Bedrock, Flash Lite, .NET Compact Framework, Rhomobile, and WorkLight Mobile Platform. Other development environments are available without cost including, by way of non-limiting examples, Lazarus, MobiFlex, MoSync, and Phonegap. Also, mobile device manufacturers distribute software developer kits including, by way of non-limiting examples, iPhone and iPad (iOS) SDK, Android™ SDK, BlackBerry® SDK, BREW SDK, Palm® OS SDK, Symbian SDK, webOS SDK, and Windows® Mobile SDK.

Those of skill in the art will recognize that several commercial forums are available for distribution of mobile applications including, by way of non-limiting examples, Apple® App Store, Google® Play, Chrome WebStore, BlackBerry® App World, App Store for Palm devices, App Catalog for webOS, Windows® Marketplace for Mobile, Ovi Store for Nokia® devices, Samsung® Apps, and Nintendo® DSi Shop.

Standalone Application

In some embodiments, a computer program includes a standalone application, which is a program that is run as an independent computer process, not an add-on to an existing process, e.g., not a plug-in. Those of skill in the art will recognize that standalone applications are often compiled. A compiler is a computer program(s) that transforms source code written in a programming language into binary object code such as assembly language or machine code. Suitable compiled programming languages include, by way of non-limiting examples, C, C++, Objective-C, COBOL, Delphi, Eiffel, Java™, Lisp, Python™, Visual Basic, and VB .NET, or combinations thereof. Compilation is often performed, at least in part, to create an executable program. In some embodiments, a computer program includes one or more executable complied applications.

Data Stores

In some embodiments, the platforms, systems, media, and methods disclosed herein include one or more data stores. In view of the disclosure provided herein, those of skill in the art will recognize that data stores are repositories for persistently storing and managing collections of data. Types of data stores repositories include, for example, databases and simpler store types, or use of the same. Simpler store types include files, emails, and the like. In some embodiments, a database is a series of bytes that is managed by a DBMS. Many databases are suitable for receiving various types of data, such as weather, maritime, environmental, civil, governmental, or military data. In various embodiments, suitable databases include, by way of non-limiting examples, relational databases, non-relational databases, object-oriented databases, object databases, entity-relationship model databases, associative databases, and XML databases. Further non-limiting examples include SQL, PostgreSQL, MySQL, Oracle, DB2, and Sybase. In some embodiments, a database is internet-based. In some embodiments, a database is web-based. In some embodiments, a database is cloud computing based. In some embodiments, a database is based on one or more local computer storage devices.

While preferred embodiments of the present disclosure have been shown and described herein, it will be obvious to those skilled in the art that such embodiments are provided by way of example only. Numerous variations, changes, and substitutions will now occur to those skilled in the art without departing from the described system. It should be understood that various alternatives to the embodiments described herein may be employed in practicing the described system.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results.

Moreover, the separation or integration of various system modules and components in the implementations described earlier should not be understood as requiring such separation or integration in all implementations, and it should be understood that the described components and systems can generally be integrated together in a single product or packaged into multiple products. Accordingly, the earlier description of example embodiments does not define or constrain this disclosure. Other changes, substitutions, and alterations are also possible without departing from the spirit and scope of this disclosure.

Thus, the invention provides, among other things, a system for detecting flooding in a facility. Various features and advantages of the invention are set forth in the following claims.

What is claimed:

1. A fixture for flooding detection, the fixture comprising:
a communication interface;
a processor; and
a computer-readable storage media coupled to the processor and having instructions stored thereon which, when executed by the processor, cause the processor to perform operations comprising:
receiving, from a first sensor of a leak detection device, a first signal indicative of a water level at a location within a facility,
determining, based on the first signal, a shut-off condition when the water level at the location within the facility has reached a first predetermined height,
transmitting, via the communication interface, a shut-off signal to at least one water inlet at the location within the facility,
receiving, from a second sensor of the leak detection device, a second signal indicative of the water level at the location within the facility, wherein the second sensor is located a greater distance from a ground surface than the first sensor,
determining, based on the second signal, an open condition when the water level at the location within the facility has reached a second predetermined height and the shut-off signal has been transmitted to the at least one water inlet, and
transmitting, via the communication interface, an open command to a drain at the location, wherein a valve opens to allow water to flow down the drain in response to receiving the open command.

2. The fixture of claim 1, wherein the operations further comprise:
transmitting, to a remote device via the communication interface, a first indication indicating the water level at the location within the facility and a second indication indicating that a shut-off signal was transmitted to at least one water inlet.

3. The fixture of claim 2, wherein the operations further comprise:
receiving, from the remote device via the communication interface, prior to transmitting the first indication and the second indication, a user input triggering a shut off of the at least one water inlet.

4. The fixture of claim 2, wherein the operations further comprise:
determining, based on a signal from the at least one water inlet, that the shut-off of the at least one water inlet did not occur, and providing, to the remote device via the communication interface, in response to the determining that the shut-off of the at least one water inlet did not occur, an alert to dispatch personnel to manually shut off the at least one water inlet.

5. The fixture of claim 4, wherein the remote device is a local building management system (BMS).

6. The fixture of claim 1, wherein the fixture receives the first signal from the first sensor via the communication interface.

7. The fixture of claim 1, wherein the fixture comprises the leak detection device, and wherein the first sensor is physically and electrically integrated into the fixture.

8. The fixture of claim 1, wherein the first sensor is one of a capacitive sensor, a weight sensor, an ultrasonic sensor, a resistive sensor, a thermal sensor, and a magnetic sensor.

9. A server configured to detect flooding, the server comprising:
a communication interface configured to facilitate communication between a fixture and one or more devices which execute an application;
a memory configured to store instructions; and
a processor coupled to the memory and the communication interface, the processor executing flooding detection in conjunction with the instructions stored in the memory, wherein the instructions include:
receiving, from a first sensor of a leak detection device, a first signal indicative of a water level at a location within a facility,
determining, based on the first signal, a shut-off condition when the water level at the location within the facility has reached a first predetermined height,
transmitting, via the communication interface, a shut-off signal to at least one water inlet at the location within the facility,
receiving, from a second sensor of the leak detection device, a second signal indicative of the water level at the location within the facility, wherein the second sensor is located a greater distance from a ground surface than the first sensor,
determining, based on the second signal, an open condition when the water level at the location within the facility has reached a second predetermined height and the shut-off signal has been transmitted to the at least one water inlet, and
transmitting, via the communication interface, an open command to a drain at the location, wherein a valve opens to allow water to flow down the drain in response to receiving the open command.

10. The server of claim 9, wherein the instructions further include:
transmitting, to a remote device via the communication interface, a first indication indicating the water level at the location within the facility and a second indication indicating that a shut-off signal was transmitted to at least one water inlet.

11. The server of claim 10, wherein the instructions further include:
receiving, from the at least one water inlet via the communication interface, temperature and pressure data associated with the at least one water inlet prior to the shut-off signal,
determining, based on the temperature and pressure data, at least one variation in at least one of the temperature and the pressure of the water at the at least one water inlet, and
providing, to the remote device via the communication interface, an alert indicating the at least one variation.

12. The server of claim 10, wherein the instructions further include:
receiving, via the communication interface, a second signal from a roof drain that is installed at the location within the facility,
determining, via the communication interface, that the roof drain is experiencing one of an overflow condition and a leak condition, and
transmitting, to the remote device via the communication interface, a third indication indicating that the roof drain is experiencing one of the overflow condition and the leak condition.

13. The server of claim 12, wherein the instructions further include:
determining, in response to determining that the roof drain is experiencing one of the overflow condition and the leak condition, that the roof drain caused the flooding.

14. The server of claim 10, wherein the instructions further include:
providing, to a user interface of the remote device via the communication interface in response to transmitting the first indication, a marker that marks the location within the facility of the at least one water inlet that is causing the flooding.

15. A flooding detecting system comprising:
a fixture;
a first sensor communicatively coupled to the fixture; and
a server, wherein the server comprises:
a communication interface configured to facilitate communication between the fixture and one or more devices which execute an application;
a memory configured to store instructions; and
a processor coupled to the memory and the communication interface, the processor executing flooding detection in conjunction with the instructions stored in the memory, wherein the instructions include:
receiving, from a first sensor, a first signal indicative of a water level at a location within a facility,
determining, based on the first signal, a shut-off condition when the water level at the location within the facility has reached a first predetermined height,
transmitting, via the communication interface, a shut-off signal to at least one water inlet at the location within the facility,
receiving, from a second sensor, a second signal indicative of the water level at the location within the facility, wherein the second sensor is located a greater distance from a ground surface than the first sensor,
determining, based on the second signal, an open condition when the water level at the location within the facility has reached a second predetermined height and the shut-off signal has been transmitted to the at least one water inlet, and
transmitting, via the communication interface, an open command to a drain at the location, wherein a valve opens to allow water to flow down the drain in response to receiving the open command.

16. The system of claim 15, wherein the instructions further include:
transmitting, to a remote device via the communication interface, a first indication indicating the water level at the location within the facility and a second indication indicating that a shut-off signal was transmitted to at least one water inlet.

17. The system of claim 15, wherein the first sensor is physically and electrically integrated into the fixture.

\* \* \* \* \*